(12) United States Patent
Froment et al.

(10) Patent No.: US 8,803,817 B1
(45) Date of Patent: Aug. 12, 2014

(54) MIXED USE MULTI-DEVICE INTEROPERABILITY

(75) Inventors: Arnaud Froment, San Jose, CA (US); John T. Kim, La Canada, CA (US)

(73) Assignee: Amazon Technologies, Inc., Reno, NV (US)

( * ) Notice: Subject to any disclaimer, the term of this patent is extended or adjusted under 35 U.S.C. 154(b) by 1047 days.

(21) Appl. No.: 12/715,938

(22) Filed: Mar. 2, 2010

(51) Int. Cl.
*G06F 3/041* (2006.01)

(52) U.S. Cl.
USPC ............. 345/173; 345/156; 345/184; 345/1.1

(58) Field of Classification Search
USPC .................................. 345/156–173; 715/700
See application file for complete search history.

(56) References Cited

U.S. PATENT DOCUMENTS

| | | | |
|---|---|---|---|
| 6,043,798 A | 3/2000 | Yamamoto et al. | |
| 6,327,152 B1 | 12/2001 | Saye | |
| 6,340,957 B1 | 1/2002 | Adler et al. | |
| 6,593,902 B1 | 7/2003 | Ogino et al. | |
| 6,697,251 B1 | 2/2004 | Aisenberg | |
| 7,065,575 B1 | 6/2006 | Machiraju et al. | |
| 7,068,294 B2 | 6/2006 | Kidney et al. | |
| 7,171,692 B1 | 1/2007 | DeMello et al. | |
| 7,239,898 B2 | 7/2007 | Lenchik et al. | |
| 7,379,975 B2 | 5/2008 | Hussmann | |
| 7,409,231 B2 | 8/2008 | Oba et al. | |
| 7,496,630 B2 | 2/2009 | Arellano et al. | |
| 7,564,425 B2 | 7/2009 | Martinez et al. | |
| 7,782,274 B2 | 8/2010 | Manning | |
| 7,941,197 B2 | 5/2011 | Jain et al. | |
| 2002/0091877 A1 | 7/2002 | Karidis | |
| 2002/0129097 A1 | 9/2002 | Jia | |
| 2003/0041206 A1 | 2/2003 | Dickie | |
| 2003/0055867 A1 | 3/2003 | King | |
| 2004/0080528 A1 | 4/2004 | Rand et al. | |
| 2004/0196210 A1 | 10/2004 | Nagatsuka et al. | |
| 2004/0223485 A1 | 11/2004 | Arellano et al. | |
| 2005/0138576 A1 | 6/2005 | Baumert et al. | |
| 2005/0219223 A1 | 10/2005 | Kotzin et al. | |
| 2005/0275602 A1 | 12/2005 | Murgolo et al. | |
| 2006/0087993 A1 | 4/2006 | Sengupta et al. | |
| 2006/0146765 A1 | 7/2006 | Van De Sluis et al. | |
| 2007/0064147 A1 | 3/2007 | Kondo et al. | |
| 2007/0182663 A1* | 8/2007 | Biech .............................. 345/1.1 |
| 2007/0266119 A1 | 11/2007 | Ohly | |
| 2007/0279315 A1 | 12/2007 | Laves et al. | |
| 2008/0005233 A1 | 1/2008 | Cai et al. | |

(Continued)

OTHER PUBLICATIONS

Office action for U.S. Appl. No. 12/715,943, mailed on Oct. 6, 2011, Froment et al., "Rendering on Composite Portable Devices", 22 pages.

(Continued)

*Primary Examiner* — Alexander Eisen
*Assistant Examiner* — Kenneth B Lee, Jr.
(74) *Attorney, Agent, or Firm* — Lee & Hayes, PLLC

(57) ABSTRACT

An electronic book reader device leverages a secondary device via an ad hoc network connection to enhance user experience as the user is consuming content on the electronic book reader device. In particular, the secondary device may be equipped with a touch screen and notepad functionality, which may be leveraged to receive user input with respect to content being presented on the electronic book reader device. The user input may take any number of forms, including freeform entry of information (e.g., read notes), control commands, highlights, and so forth.

30 Claims, 18 Drawing Sheets

(56) References Cited

U.S. PATENT DOCUMENTS

| | | | |
|---|---|---|---|
| 2008/0005656 A1 | 1/2008 | Pang et al. | |
| 2008/0177822 A1* | 7/2008 | Yoneda | 709/202 |
| 2008/0259057 A1* | 10/2008 | Brons | 345/184 |
| 2008/0320501 A1 | 12/2008 | Li et al. | |
| 2009/0101716 A1 | 4/2009 | Mani et al. | |
| 2009/0149218 A1 | 6/2009 | Chen et al. | |
| 2009/0309846 A1* | 12/2009 | Trachtenberg et al. | 345/173 |
| 2010/0013762 A1 | 1/2010 | Zontrop et al. | |
| 2010/0082784 A1* | 4/2010 | Rosenblatt et al. | 709/222 |
| 2010/0115096 A1 | 5/2010 | Eruchimovitch et al. | |
| 2010/0156913 A1 | 6/2010 | Ortega et al. | |
| 2010/0278345 A1 | 11/2010 | Alsina et al. | |
| 2011/0102314 A1* | 5/2011 | Roux | 345/156 |
| 2011/0239101 A1 | 9/2011 | Rivers-Moore et al. | |

OTHER PUBLICATIONS

Office action for U.S. Appl. No. 12/493,864, mailed on Oct. 6, 2011, Kim, "Multi-Device Interoperability", 26 pages.

Final Office Action for U.S. Appl. No. 12/493,864, mailed on Apr. 13, 2012, John T Kim, "Multi-Device Interoperability", 32 pages.

Final Office Action for U.S. Appl. No. 12/715,943, mailed on May 25, 2012, Froment et al., "Rendering on Composite Portable Devices", 23 pages.

Office action for U.S. Appl. No. 12/715,943, mailed on Jan. 3, 2013, Froment et al., "Rendering on Composite Portable Devices", 26 pages.

Office action for U.S. Appl. No. 12/715,981, mailed on Mar. 26, 2013, Froment et al., "Composite Portable Devices", 19 pages.

Final Office Action for U.S. Appl. No. 12/715,943, mailed on Nov. 20, 2013, Arnaud Froment, "Rendering on Composite Portable Devices", 23 pages.

Office action for U.S. Appl. No. 12/493,864, mailed on Mar. 14, 2014, Kim, "Multi-Device Interoperability", 21 pages.

Office Action for U.S. Appl. No. 12/715,943, mailed on May 30, 2014, Arnaud Froment, "Rendering on Composite Portable Devices", 24 pages.

* cited by examiner

MIXED USE MULTI-DEVICE INTEROPERABILITY

BACKGROUND

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistant (PDA), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes an architecture and techniques in which a primary electronic content rendering device leverages a secondary electronic content rendering device over an ad hoc network to enhance user experience when consuming media items on the primary device. The media items may be of various types of digital content, such as music, movies, images, electronic books, and so on. The content rendering devices may be embodied in many ways, such as electronic book readers, cellular telephones, personal digital assistant (PDA), portable media players, tablet computers, netbooks, and the like. However, in specific implementations described below, the primary content rendering device is a dedicated handheld electronic book (eBook) reading device ("eBook reader device" or simply "eBook reader") that uses an ad hoc network to connect to a neighboring secondary device in order to leverage that secondary device to enhance user experience while the user consumes an eBook or other media item on the eBook reader.

Architectural Environment

Figure 1:
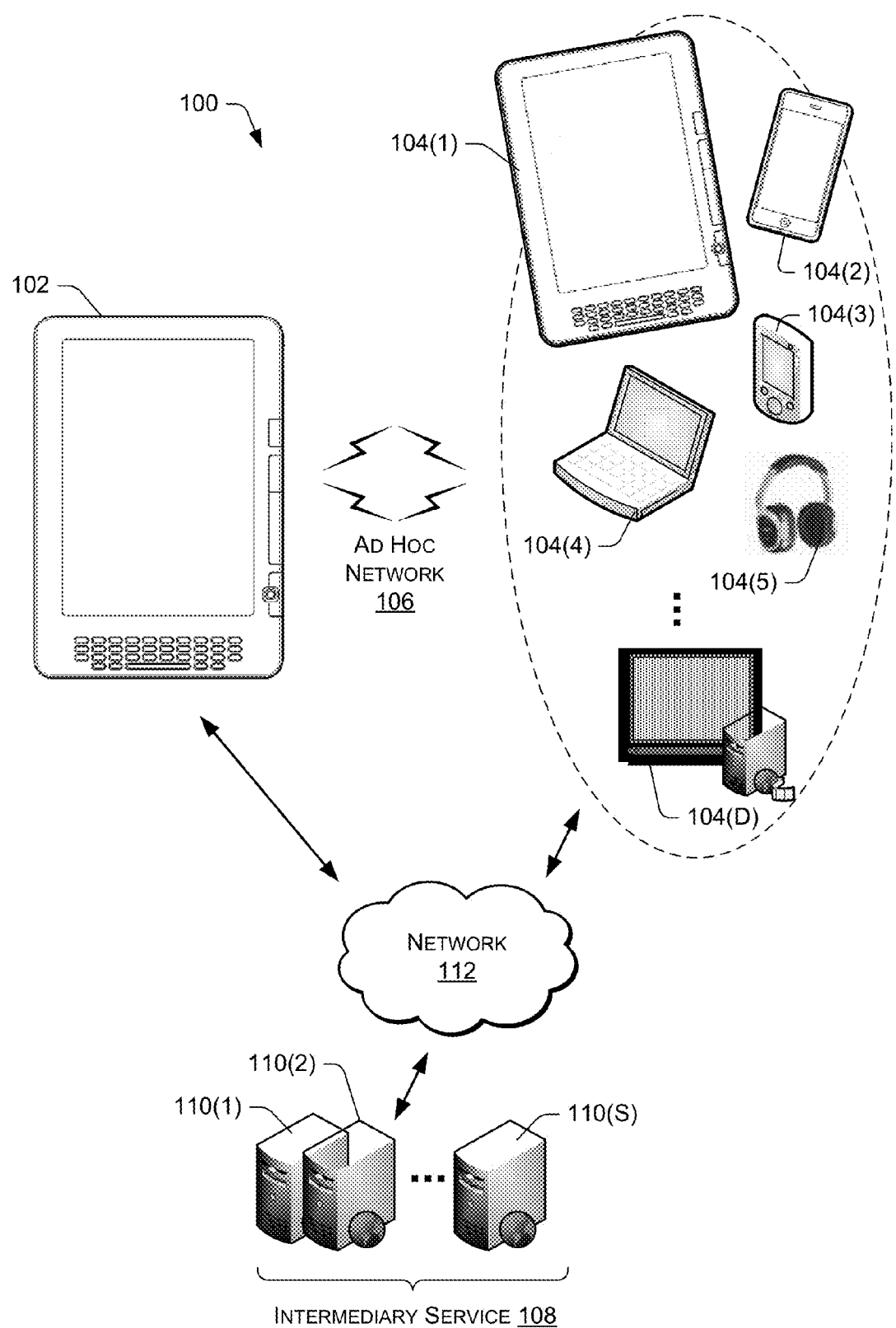
FIG. 1 illustrates an architecture in which one electronic content rendering device, such as an electronic book reader device, may leverage other electronic content rendering devices to enhance user experience.

FIG. 1 illustrates an example architecture 100 in which one electronic content rendering device may leverage other electronic content rendering devices to enhance user experience. The electronic devices are variously configured with different functionality to enable consumption of one or more types of media items. The media items may be any type or format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. As discussed further herein, while a media item is being rendered on one device (e.g., displaying an eBook on an eBook reader), another device may be utilized to enhance that experience by rendering another part of the media item (e.g., displaying another portion of text, playing video or audio clips, etc.), or providing additional information in support of the media item (e.g., conducting and showing search results).

In the illustrated architecture 100, an electronic book reader device 102 is provided to consume digital media items such as electronic books, magazines, audio books, and so forth. The eBook reader device 102 leverages one or more other devices 104(1), 104(2), . . . , 104(D) to enhance or extend presentation of content being consumed on the eBook reader device 102. Through user selected modes, the eBook reader device 102 directs operation of the other devices to assist in enhancing presentation of the media item. Accordingly, the eBook reader device 102 may be referred to as the primary or master device, whereas the other devices 104(1)-(D) may be referred to as the secondary or slave devices. In other implementations, the relationship between the eBook reader 102 and a secondary device may be peer to peer.

Essentially any type of content rendering device may be used to consume media items, and thereby provide a media experience. In this example, the other devices include a second eBook reader device 104(1), a multifunction communication device 104(2) such as the iPhone® device from Apple, Inc., a portable digital assistant (PDA) 104(3), a laptop computer 104(4), a wireless headset 104(5), and an entertainment system 104(D). While these example devices are shown for purposes of illustration and discussion, it is noted that many other electronic devices may be used, such as portable media players, tablet computers, cameras, video cameras, netbooks, notebooks, desktop computers, gaming consoles, DVD players, media centers, and the like.

The eBook reader device 102 may communicate with one of the secondary devices 104(1)-(D) via an ad hoc network 106. An ad hoc network is a self-configuring network of devices that connect to one another using wireless links, such as WiFi, Bluetooth, infrared (IR), radio, and so on. In such networks, which are also referred to as "mesh" networks, protocols exist to enable wireless devices to discover and connect to one another. One example of a wireless technology and associated protocols is the WiFi wireless networking technologies defined according to IEEE 802.11 standards. Bluetooth is another example of an open wireless protocol for exchanging data over short distances between devices.

In some implementations described herein, the ad hoc network may be established between just two devices, such as the primary device 102 and a secondary device 104. These devices may be operated in a master/slave arrangement, or in a peer-to-peer arrangement. In other implementations, the ad hoc network may be embodied as a mesh network where some devices act as intermediary devices between the endpoint devices. In such cases, the intermediary devices may be configured as both master/slave to receive communication from one device (such as the primary eBook reader device 102) and pass that communication onto the next device (such as another secondary device 104).

Alternatively, the eBook reader device 102 may indirectly leverage one of the secondary devices 104(1)-(D) by sending instructions through an intermediary party, such as a service 108 hosted on a server system composed of multiple servers 110(1), 110(2), ..., 110(S). The eBook reader device 102 and the secondary devices 104(1)-(D) communicate with the service 108 over a network 112. The network 112 is representative of any one or combination of multiple different types of networks, such as the Internet, cable networks, cellular networks, wireless networks, and wired networks.

The servers 110(1)-(S) collectively have processing and storage capabilities to receive requests from the eBook reader device 102 for enhanced media experience and to facilitate identification of the appropriate secondary device 104(1)-(D) to assist the eBook reader device. In one implementation, the servers 110(1)-(S) facilitate continuing communication between the two or more devices as an alternative to, or in addition to, use of the ad hoc network 106. In some implementations, the servers 110(1)-(S) store the digital media items, although in other implementations, the servers merely facilitate communications between devices. The servers 110(1)-(S) may be embodied in any number of ways, including as a single server, a cluster of servers, a server farm or data center, and so forth, although other server architectures (e.g., mainframe) may also be used.

In this implementation, the primary device 102 and secondary devices 104(1)-(D) need not be aware of one another, nor need to discover one another; rather, the devices register with the service 108, which facilitates communication among the devices. For instance, the user may register all of his devices at the service 108, so that he can consume the same media items on various devices per the legal licenses terms associated with the media items. For instance, the user may register an eBook reader and a PDA with a reader application, so that both devices may be used to consume the same eBooks.

The architecture 100 enhances the user experience by allowing the rendering of a media item (or portions thereof) on the primary eBook reader device 102 together with an enhancing operation being performed on one of the secondary devices 104(1)-(D), such as rendering the same media item (or portions thereof) or presenting additional information. For instance, suppose the eBook reader device 102 is consuming an electronic book that has a video clip embedded in the text. If a secondary device 104(1)-(D) capable of rendering video is available (e.g., proximally present via the ad hoc network 106, or registered with the service 108), the eBook reader device 102 may instruct the secondary device to render the video clip while the eBook continues to be rendered on the eBook reader device 102. This multimedia presentation using two different devices provides a richer user experience.

There are many possible configurations in which one device may leverage a secondary device. Several example configurations are provided below with respect to FIGS. 4-18. However, these are merely examples, and not intended to be limiting. Prior to describing these configurations, however, one possible implementation of a device will be described first in more detail with reference to FIG. 2.

Exemplary Device

Figure 2:
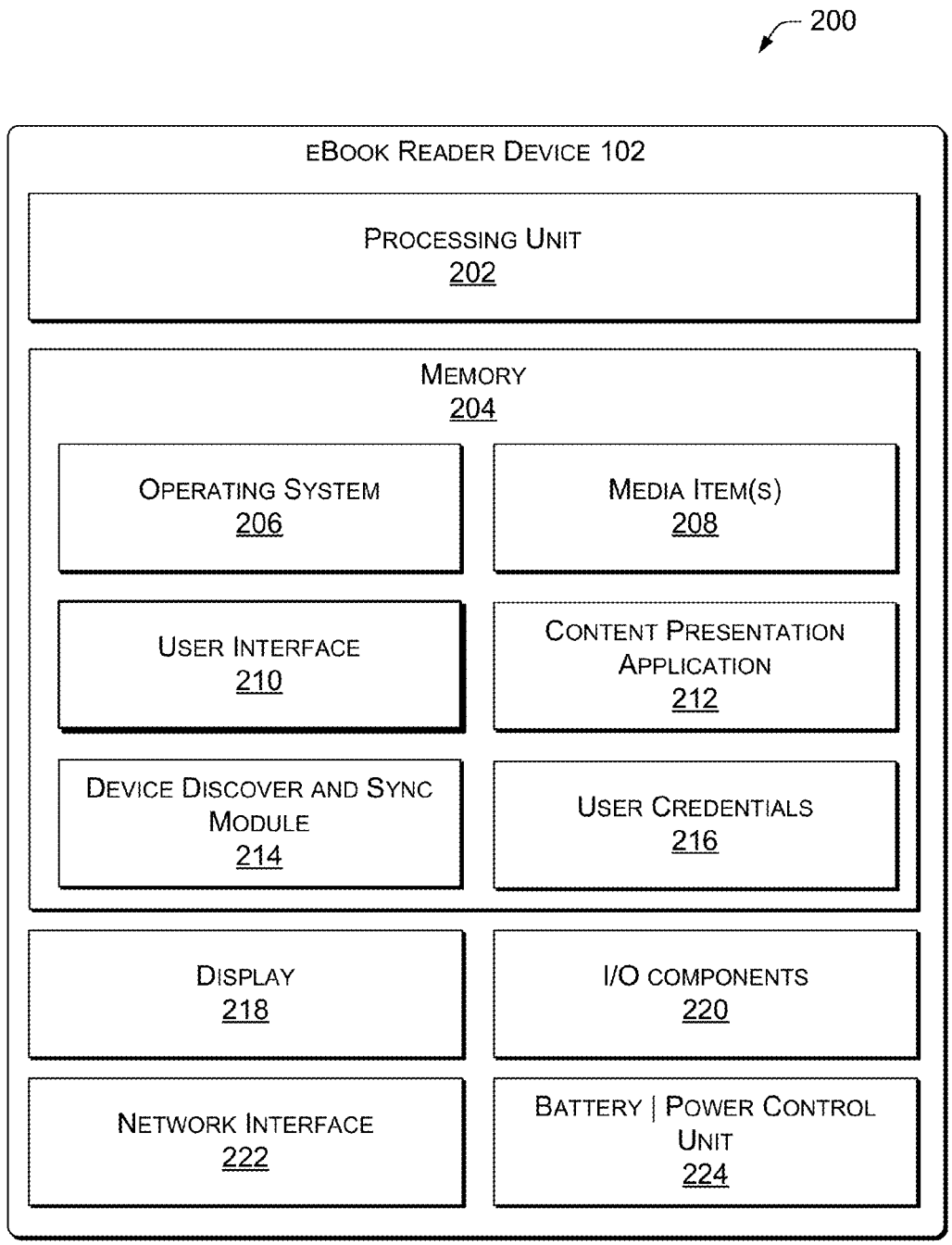
FIG. 2 is a block diagram illustrating selected modules in an electronic content rendering device, such as an electronic book reader device.

FIG. 2 illustrates exemplary components 200 that might be implemented in the eBook reader device 102 (or 104(1)). In particular, the eBook reader device 102 is a dedicated, handheld eBook reader device equipped with a passive display to display electronic documents, such as electronic books or "eBooks". The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages etc. Accordingly, the terms book and/or eBook may include any content that is in electronic or digital form.

In a very basic configuration, the device 102 includes a processing unit 202 composed one of one or more processors, and memory 204. Depending on the configuration of a dedicated eBook reader device 102, the memory 204 is an example of computer storage media and may include volatile and nonvolatile memory. Thus, the memory 204 may include, but is not limited to, RAM, ROM, EEPROM, flash memory, or other memory technology, or any other medium which can be used to store media items or applications and data which can be accessed by the eBook reader device 102.

The memory 204 may be used to store any number of functional components that are executable on the processing unit 202, as well as data and media items that are rendered by the eBook reader device 102. Thus, the memory 204 may store an operating system 206 and an eBook storage database to store one or more media items 208, such as eBooks and audio books. The memory may further include a memory portion designated as an immediate page memory to temporarily store one or more pages of an electronic book. The pages held by the immediate page memory are placed therein a short period before a next page request is expected.

The term "page," as used herein, refers to a collection of content that is presented at one time in a display of the eBook reader device 102. Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

A user interface module 210 may also be provided in memory 204 and executed on the processing unit 202 to provide for user operation of the device 102. The UI module 210 also allows the user to set various usage modes that facilitate extended operation using the secondary electronic device. The UI module 210 may provide menus and other navigational tools to facilitate selection and rendering of the media items 208. The UI module 210 may further include a browser or other application that facilitates access to sites over a network, such as websites or online merchants.

A content presentation application 212 renders the media items 208. The content presentation application 212 may be implemented as various applications depending upon the media items. For instance, the application 212 may be an electronic book reader application for rending electronic books, or an audio player for playing audio books, or a video player for playing video, and so forth.

A device discover and synchronization module 214 is stored in memory 204 and executed on the processing unit 202 to establish a connection with a neighboring device over an ad hoc network. Once connected, the module 214 further facilitates synchronization with the other device. For instance, in some implementations described herein, it is desirable to have the secondary device synchronized to render the same portion of the media item, or to launch operations upon reaching a certain location in the media item.

User credentials 216 may also be stored in the memory 204. The credentials 216 may be device specific (set during manufacturing) or provided as part of a registration process for a service. The credentials may be used to ensure compliance with DRM aspects of rendering the media items 208 and to associate secondary devices with the primary device.

The eBook reader device 102 may further include a display 218. In one implementation, the display uses ePaper display technology, which is bi-stable, meaning that it is capable of holding text or other rendered images even when very little or no power is supplied to the display. Some exemplary ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

The eBook reader device 102 may further be equipped with various input/output (I/O) components 220. Such components may include various user interface controls (e.g., buttons, joystick, keyboard, etc.), audio speaker, connection ports, and so forth.

A network interface 222 supports both wired and wireless connection to various networks, such as cellular networks, radio, WiFi networks, short range networks (e.g., Bluetooth), IR, and so forth.

The eBook reader device 102 also includes a battery and power control unit 224. The power control unit operatively controls an amount of power, or electrical energy, consumed by the eBook reader device. Actively controlling the amount of power consumed by the reader device may achieve more efficient use of electrical energy stored by the battery.

The eBook reader device 102 may have additional features or functionality. For example, the eBook reader device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

General Operation

Figure 3:
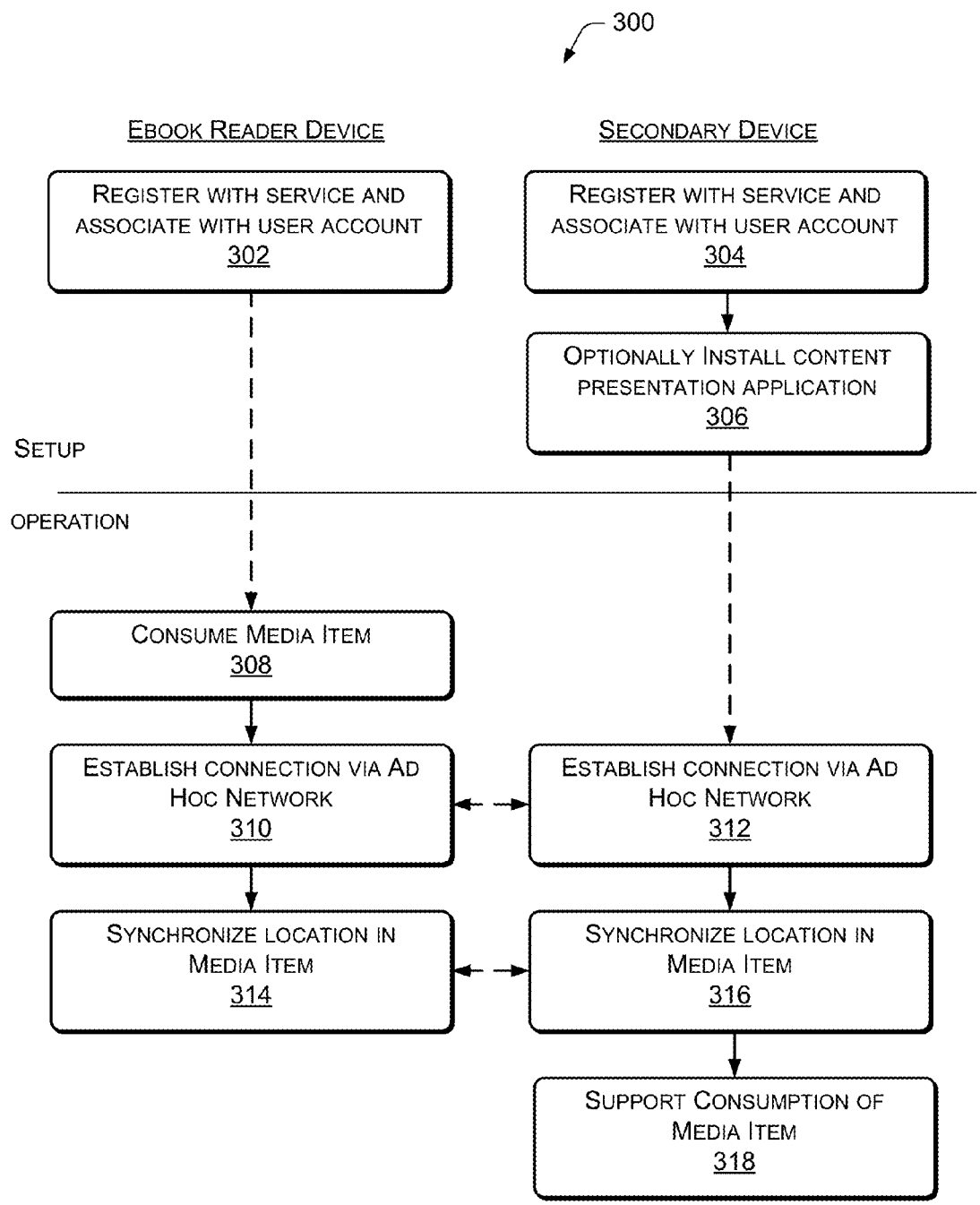
FIG. 3 is a flow diagram of a general process of leveraging a secondary device from a primary electronic book reader device to enhance user experience when consuming content on the electronic book reader device.

FIG. 3 shows a general process 300 of leveraging a secondary device from a primary eBook reader device to enhance user experience when consuming content on the eBook reader device. The process 300 (as well as processes described below with respect to FIGS. 7, 9, 11, 13, and 17) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the process 300 (as well as processes 700, 900, 1100, 1300, and 1700 below) is described with reference to the architecture 100 of FIG. 1 and the device 200 of FIG. 2. In particular, reference is made to a primary eBook reader device 102, which leverages a secondary device 104 to enhance user experience. The acts illustrated in FIG. 3 are thus aligned beneath headings indicating those acts performed by the eBook reader device and those performed by the secondary device. Further, some acts are performed during a setup phase, whereas other acts are performed during dual device operation.

At 302, during a setup phase, the eBook reader device is registered with a service and associated with a user account. At 304, the secondary device is also registered with the service and associated with the same user account. The same credentials identifying the user may be associated with, or stored on, the eBook reader device and secondary device.

Further, for many of the implementations described below, a content presentation application may optionally be installed on the secondary device at 306. For instance, the secondary device may be another eBook reader 104(1), which will have an eBook reader application installed thereon. Alternatively, the secondary device may be a more general device (e.g., communication device 104(2) or laptop 104(4)) for which a version of a content presentation application can be installed thereon to facilitate rendering of an eBook or other media item on that device. However, in some implementation described below, the secondary device may be a passive slave, such as the wireless headset, where no application is installed.

Turning now to the operation phase, at 308, a media item is consumed on the eBook reader device. The media item may be an eBook that has text portions and non-text portions, such as a video component, a image component, and an audio component. The eBook is consumed on the eBook reader device through rendering of the text portions on the display.

At 310, the eBook reader establishes a connection over an ad hoc network with the secondary device. Similarly, at 312, the secondary device establishes a connection over an ad hoc network with the eBook reader device. In one implementation, this connection is a WiFi connection using the IEEE 802.11 standards. In another implementation, the connection may be made according to the Bluetooth protocols.

At 314 and 316, the devices optionally synchronize to a location within the media item. For instance, if the devices are both rendering the same eBook, the devices synchronize to a same portion of the text (e.g., same screen view, same excerpt, etc.). This synchronization involves the exchange and updating of position and time identifiers, so that the location of a media item most recently accessed on either of the devices is used to update both devices to the same location. Although not pertinent to this disclosure, such synchronization allows a user to switch from one device to another without losing his place in the eBook. For instance, suppose a user is reading the eBook on her eBook reader device, but then leaves for work. Rather than taking the eBook reader device, the user continues reading the eBook on her communication device 104(2). By synchronizing the two devices, the communication device 104(2) is queued to the same location in the eBook. In one implementation, the synchronization is achieved using a technology described in U.S. patent Ser. No. 12/273,473 entitled "Synchronization of Digital Content", which was filed on Nov. 18, 2008. This application is hereby incorporated by reference.

At 318, the secondary device supports consumption of the media item to enhance user experience while the user is consuming the media item on the eBook reader device. There are many ways for the secondary device to support consumption. In one approach, the secondary device acts as an auxiliary player, such as a media player or audio player. The user initiates a mode of operation where the eBook reader device utilizes the secondary device as the auxiliary player to consume part of the media item. For instance, if the media item is an eBook that has text components and non-text components (e.g., audio, video, images, animation, etc.), the secondary device may play or otherwise render the non-text components while the eBook reader continues to display the eBook.

In another approach, the secondary device may operate as a mirrored display. For instance, the secondary device may be another eBook reader device 104(1) that is placed in a slave mode to display essentially the same part of the eBook as being displayed on the primary eBook reader device 102. This approach may be useful, for example, where a teacher is conducting a class using her eBook reader device as a master reader device, and the students have eBook reader devices that function in a subordinate slave role, displaying essentially the same material as shown on the master reader device as the teacher moves through the material.

In still another approach, the secondary device may be operated as an extended display. When placed in this mode, the secondary device may, for example, render another portion of the media item simultaneous to the primary eBook reader device rendering a portion of the media item. For instance, if the media item is an eBook, the primary eBook reader may display a first screen view of the eBook, while the secondary device displays a second screen view of the eBook that immediately follows the first screen view.

In another approach, the secondary device supports consumption of the media item on the primary eBook reader device by being operated in an extended device mode. In this mode, the secondary device conducts operations that are derived from user interactivity with the media item. For instance, the user may initiate a search of content in the media item, and that search is conducted by the secondary device. Alternatively, the user may request a definition of a word or phrase in the eBook, and the secondary device presents the dictionary results.

In yet another approach, the secondary device may be equipped with touch screen and notepad functionality. In this configuration, the secondary device allows the user to enter information with respect to the content being presented on the primary eBook reader device. For instance, the user may enter freeform comments pertaining to the content, annotate sections of the content, enter control functionality (e.g., turn page), and answer questions about the content.

These are but a few examples. Various details of these configurations are provided below with reference to FIGS. 4-18. However, these examples are non-limiting and the architecture 100 may be used to support other configurations and usage scenarios.

Example Configuration: Secondary Device as Auxiliary Device

FIGS. 4-7 illustrate one possible configuration in which a primary device, such as an eBook reader, leverages a secondary device as an auxiliary player. In this example, the secondary device is embodied as a multifunction communication device, and specifically as an iPhone® device from Apple, Inc. While an iPhone® device is shown for discussion purposes, it is noted that other secondary devices may be used, such as a PDA, or a laptop computer.

Figure 4:
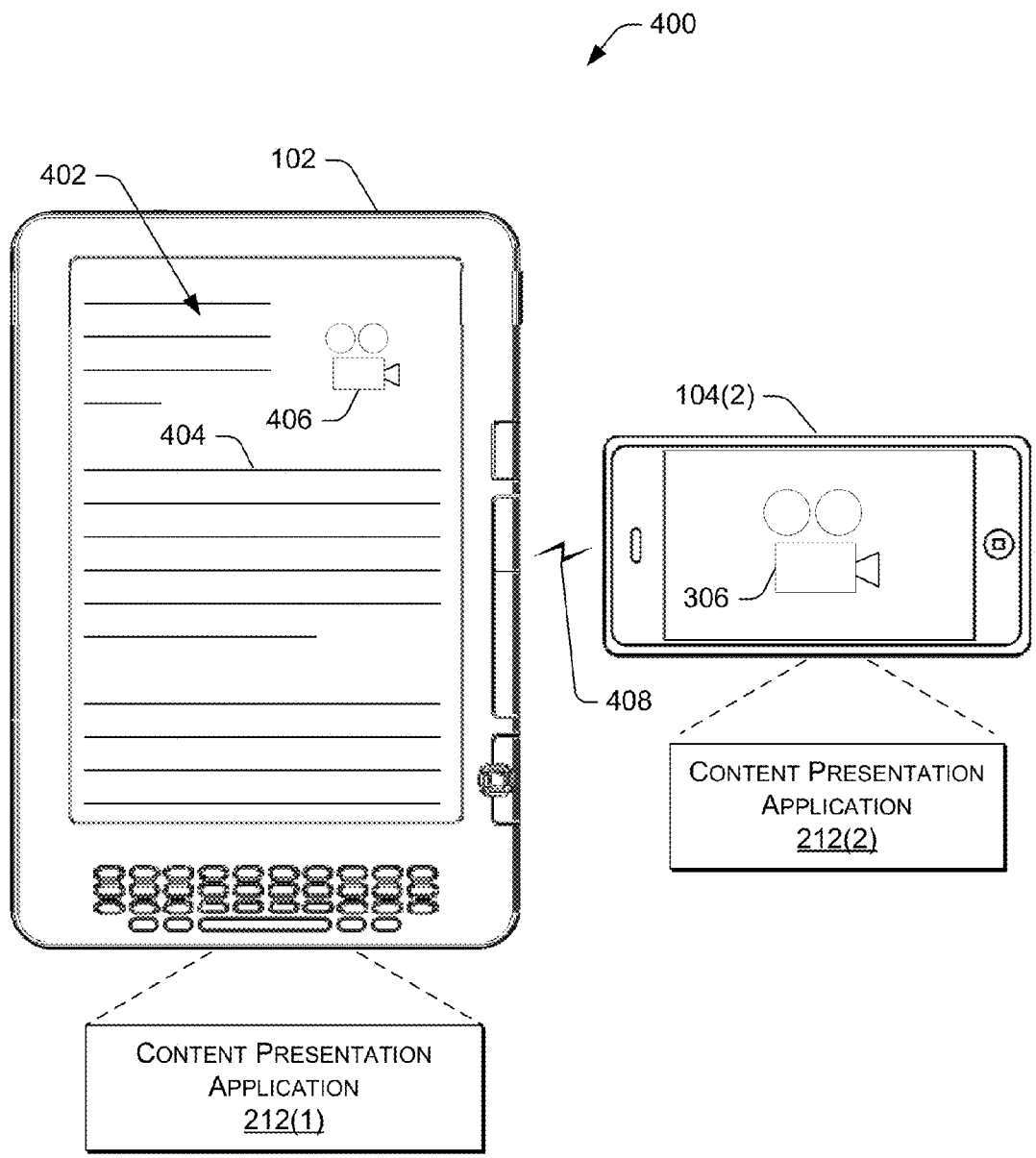
FIG. 4 illustrates a configuration in which an electronic book reader device leverages a multifunction communication device as an auxiliary device.

FIG. 4 shows a configuration 400 in which the eBook reader device 102 leverages a multifunction communication device 104(2) as an auxiliary device. Each device is configured with the content presentation application (e.g., an electronic book reader), which may be slightly different versions to accommodate different device features. As shown, a first version of the content presentation application 212(1) resides on the eBook reader device 102, whereas a second version of the content presentation application 212(2) resides on the multifunction communication device 104(2). The applications 212(1)-(2) may be configured to enforce digital rights management (DRM) rules by ensuring that copies of the media items are authorized and belong to a common user. The applications may be associated with a common user account and rely on the same user credentials.

The content presentation application 212(1) is executed to render an eBook 402 on the eBook reader device 102. The eBook 402 includes textual content 404 and a video component 406 embedded in the textual content. A copy or slightly different version of the eBook may also be stored on, or accessible by, the communication device 104(2).

The two devices are communicatively coupled via an ad hoc network connection 408. When the devices are within proximity of one another, the devices discover each other and establish the ad hoc network connection 408. Once connected, the applications 212(1)-(2) synchronize the location within the eBook 402.

As the reader encounters the video component 406 in the eBook 402, the reader may elect to view the video component. While the eBook reader 102 may or may not be configured to play video, the reader may choose to watch the video on the multifunction communication device 104(2). Since the content presentation applications 212(1) and 212(2) have already synchronized the location, the multi-function communication device 104(2) is queued up to handle the video component 406 shown on the screen view of the eBook reader device 102. The communication device 104(2) may automatically commence with playing the video component, or await user initiation.

In this manner, the user may read the eBook 402 on his eBook reader device 102, and pause to watch the video component 406 from the eBook 302 on a second device 104(2). It may be that the eBook reader device 102 is not configured to show video clips, or color versions of such video clips. Thus, by leveraging the secondary device, the reader can enjoy a multimedia presentation on dual devices to enhance the reader's experience when interacting with the content in the eBook 402.

Figure 5:
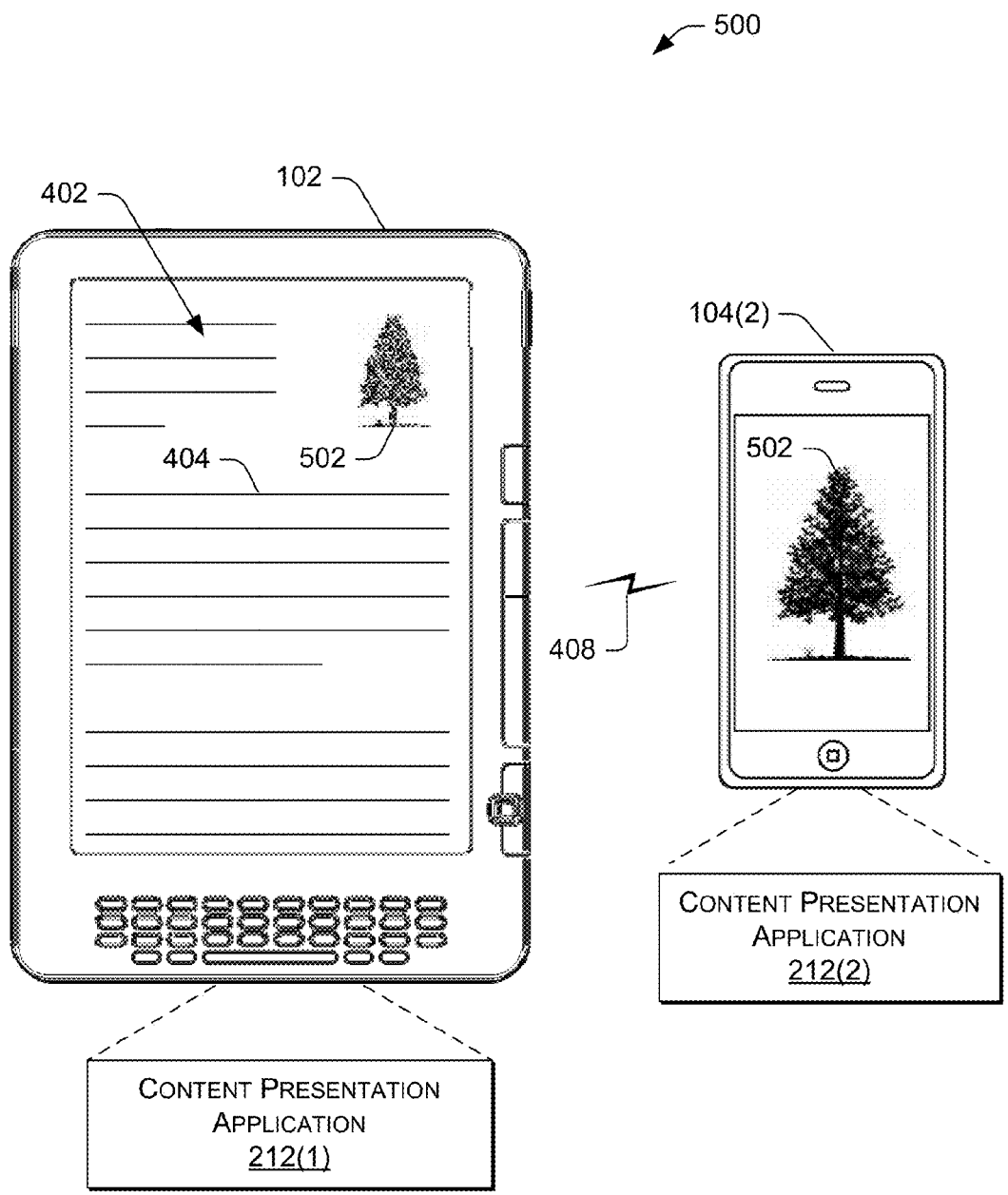
FIG. 5 illustrates another configuration in which the electronic book reader device leverages the multifunction communication device as an auxiliary device.

FIG. 5 shows another configuration 500 in which the eBook reader device 102 leverages the multifunction communication device 104(2) as an auxiliary device. In this configuration 500, another portion of the eBook 402 has a section with a graphical image 502 (instead of a video component as in FIG. 4). Again, the content presentation applications 212(1) and 212(2) synchronize the location within the eBook and hence, the multifunction communication device 104(2) is queued up to retrieve and depict the image 502. The image may appear automatically on the communication device 104(2) when the reader turns to this section of the eBook 402, or only in response to the reader's input to depict the image. By using the second device, the image may be presented in high resolution, and in full color, which may not be possible on the eBook reader device 102.

Figure 6:
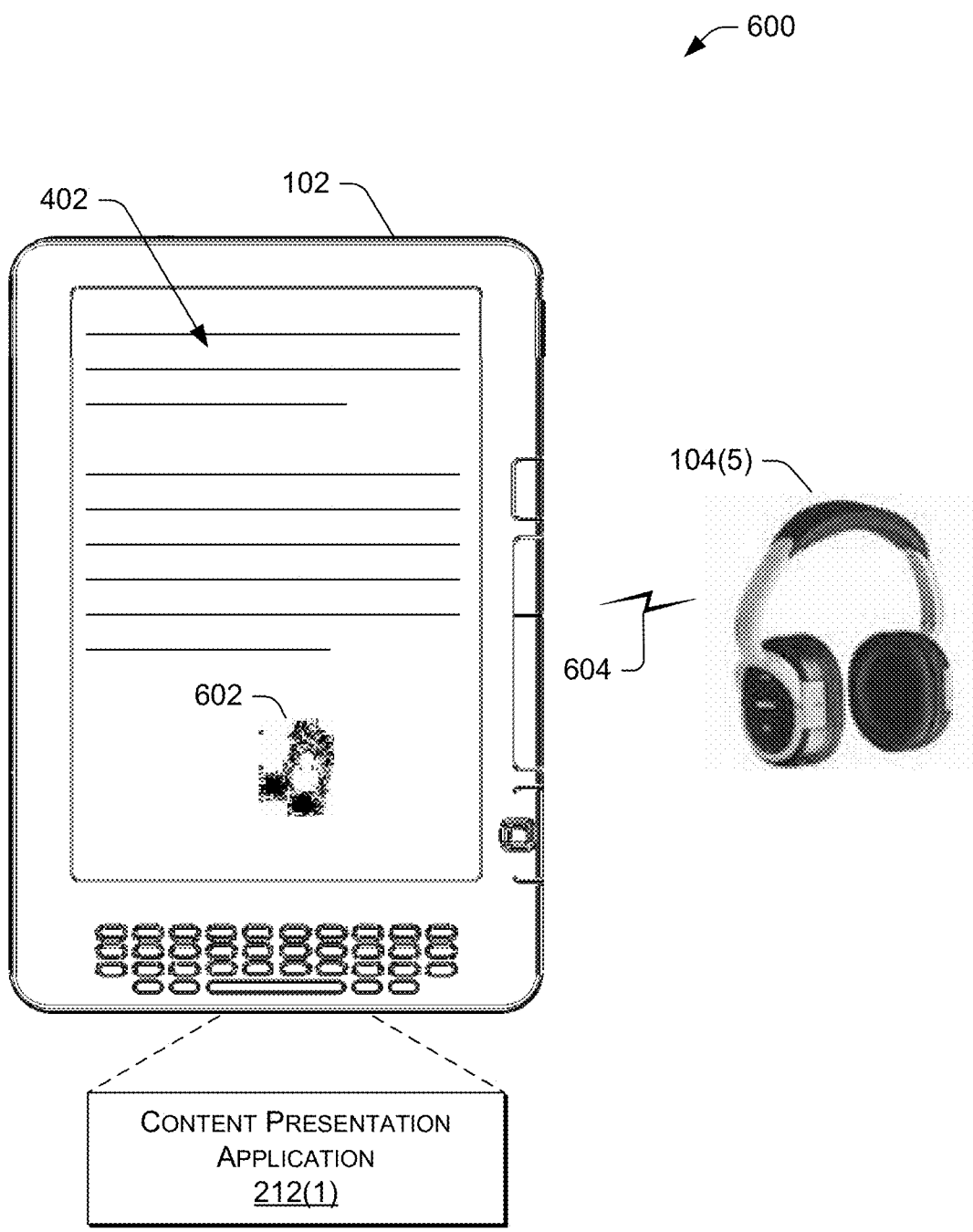
FIG. 6 illustrates yet another configuration in which the electronic book reader device leverages a secondary device embodied as a wireless headset as an auxiliary device.

FIG. 6 shows yet another configuration 600 in which the eBook reader device 102 leverages another device as an auxiliary device. In this configuration 600, the secondary device is an audio headset 104(5) that is wireless enabled (e.g., Bluetooth enabled headset). As shown, another portion of the eBook 402 is rendered on the eBook reader device 102, and the portion contains an audio component 602.

The eBook reader device 102 and the headset 104(5) are communicatively coupled via an ad hoc network connection 604. Once connected, the content presentation application 212(1) may elect to play the audio component 602, but output the audio over the connection 604 to the headset 104(5). In this scenario, the audio headset does not execute a content presentation application, but merely receives the audio data from the eBook reader device over the ad hoc network connection. In another implementation, the audio headset 104(2) or other audio playback device (e.g., PDA, communication device, laptop, etc.) may execute the content presentation application and be synchronized to the location in the eBook. This would allow the secondary device to automatically play the audio component when the reader turns to the screen view in the eBook 402 with the audio component 602.

Figure 7:
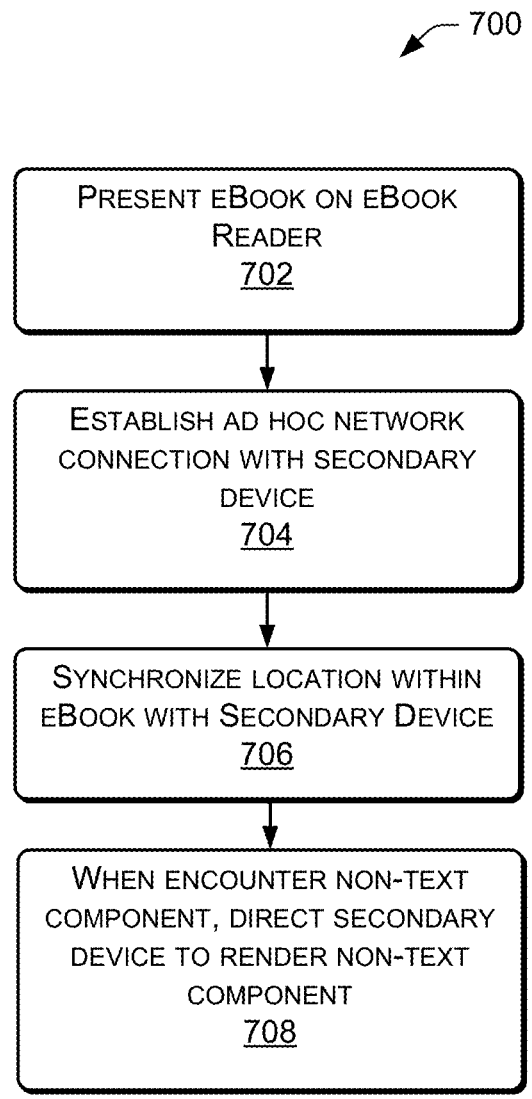
FIG. 7 is a flow diagram showing a process of utilizing a secondary device as an auxiliary player to enhance user experience.

FIG. 7 shows a process 700 of utilizing a secondary device as an auxiliary player to enhance user experience. Additional reference may be made to the example configurations of FIGS. 4-6.

At 702, the eBook is presented on a display of the eBook reader device. This is shown in FIGS. 4-6, for example, where the eBook 402 is depicted on the display of the eBook reader device 102. As shown, the eBook has a text portion 404 and at least one other non-text component, such as video component 406, an audio component 502, and an image component 602.

At 704, a connection with a secondary device is established over an ad hoc network.

At 706, the eBook reader may optionally synchronize with the secondary device as to a location within the eBook. This is particularly helpful when the secondary device is also running a reader application that is capable of tracking location within the eBook.

At 708, responsive to a usage mode, the eBook reader device directs the secondary device to render the non-textual component from the electronic book while the electronic book continues to be presented on the display of the eBook reader device. If the secondary device is synchronized to the location, it can automatically detect when the non-text component is encountered and automatically initiate playing of the non-text component. Thus, as the reader turns to a new screen view having both text and a video clip, for example, the secondary device may automatically play the video clip while the eBook reader device continues to show the screen view of text.

Example Configuration: Secondary Device as Mirrored Display

Figure 8:
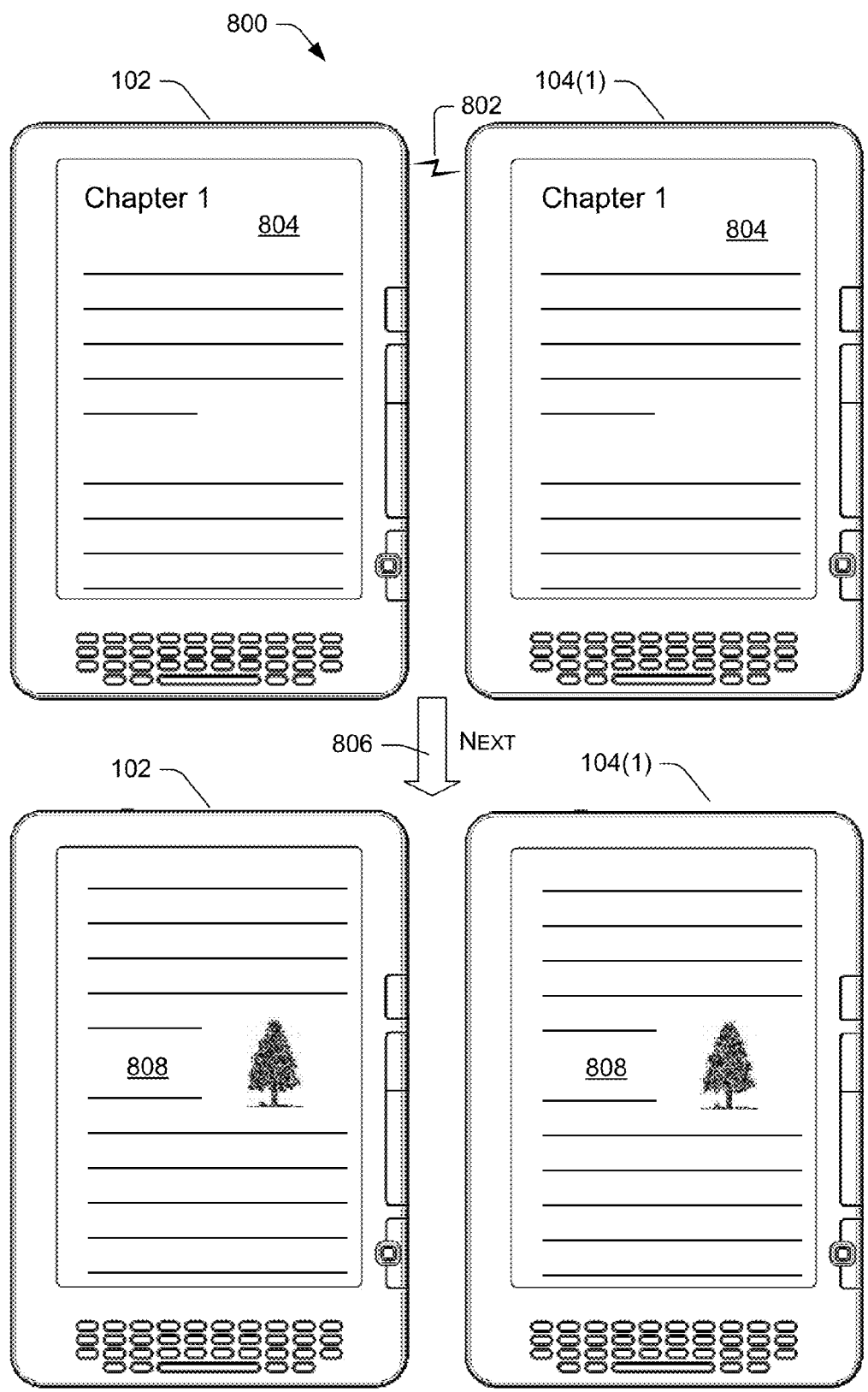
FIG. 8 illustrates a configuration in which a primary electronic book reader device and a secondary electronic book reader device are operated in mirrored display mode.
Figure 9:
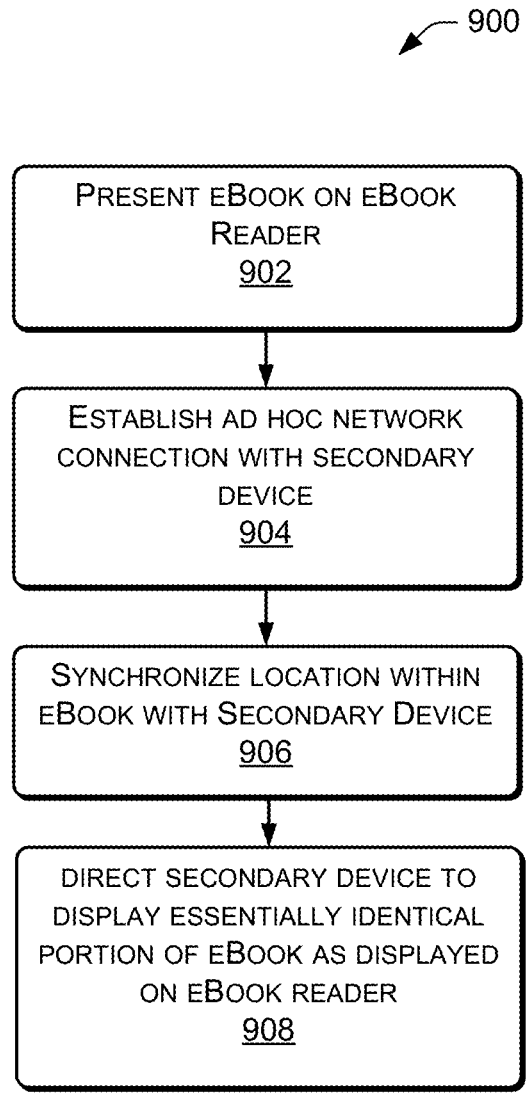
FIG. 9 is a flow diagram showing a process of utilizing a secondary device as a mirrored display to enhance user experience.

FIGS. 8-9 illustrate another configuration in which a primary device, such as an eBook reader, utilizes the secondary device as a mirrored display. In this example, the secondary device is embodied as another eBook reader device, such as device 104(1), although it need not be.

FIG. 8 shows a configuration 800 in which the primary eBook reader device 102 and the secondary eBook reader device 104(1) are operated in mirrored display mode. Each device is configured with an electronic book reader application so that both devices are able to render an eBook. The two devices are communicatively coupled via an ad hoc network connection 802. When the devices are within proximity of one another, the devices discover each other and establish the ad hoc network connection 802. Once connected, the applications synchronize to the same location within the eBook. The secondary eBook reader device can then be placed in slave mode to display essentially the same content as shown on the primary eBook reader device.

As shown here, the primary eBook reader device 102 shows a portion 804 of the eBook (e.g., chapter 1 and beginning text). As an example scenario, suppose the primary eBook reader device 102 belongs to the teacher who is instructing a classroom of students. Once connected and synchronized via the ad hoc network connection 802, the secondary eBook reader device 104(1) can display essentially the same portion 804 of the eBook as being presented on the display of the primary eBook reader device 102 (i.e., chapter 1 and beginning text). The secondary eBook reader device 104(1) belongs to each student in the class. When the teacher inputs an instruction 806 to move to the next screen view, the primary eBook reader device 102 displays the next screen view 808 as shown in the lower left panel of FIG. 8. Concurrently, the secondary eBook reader device 104(1) transitions to the same screen view 808, as shown in the lower right panel of FIG. 8. In this manner, as the teacher moves through the text, the students' eBook reader devices automatically track with the teacher, so that the students can more easily follow the material.

This scenario presents an example situation where the teacher's eBook reader device 102 and the multiple student eBook reader devices 104(1) communicate over a mesh network. Suppose, for example, that the lecture hall is large, so that point to point communication from the teacher's device to each and every student device is not possible. In this case, some of the secondary devices operated by the students may act as both master and slave units. That is, the secondary device 104(1) acts as a slave device to receive page turn commands from the master device 102, and also as a master device that sends the page turn commands onto other secondary devices in the lecture hall.

FIG. 9 shows a process 900 of utilizing a secondary device as a mirrored display to enhance user experience. Additional reference may be made to the example configuration of FIG. 8.

At 902, the eBook is presented on a display of the primary eBook reader device. At 904, a connection with a secondary device (e.g., eBook reader device) is established over an ad hoc network. At 906, the eBook reader device synchronizes with the secondary device to a location within the eBook. At 908, once placed in the slave mirrored mode, the eBook reader device directs the secondary device to display essentially the same portion of the eBook as being displayed on the eBook reader device. As the reader moves through the content on the primary eBook reader device, the secondary eBook reader device likewise moves through the content in lockstep with the first reader.

Example Configuration: Secondary Device as Extended Display

Figure 10:
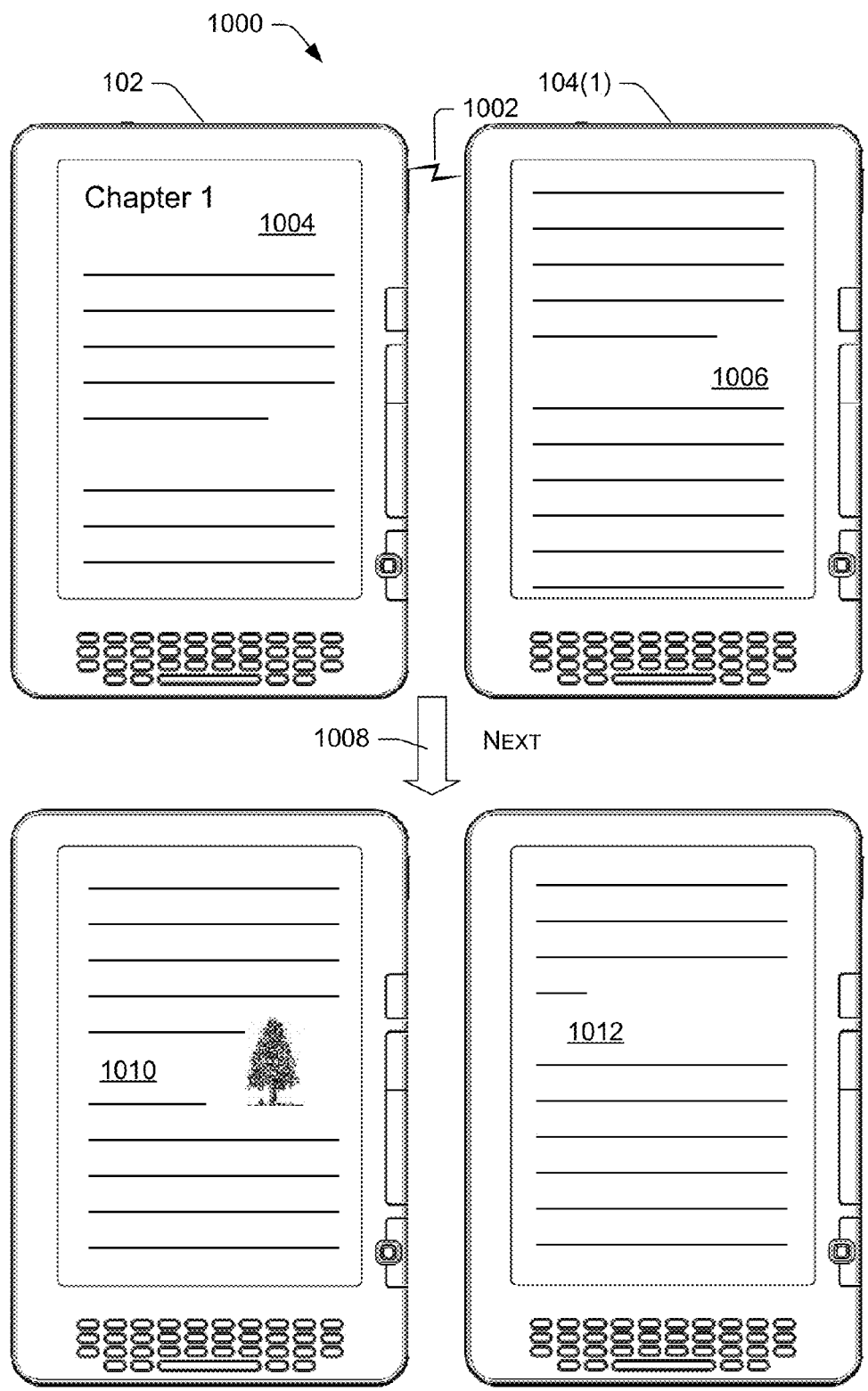
FIG. 10 illustrates a configuration in which a primary electronic book reader device and a secondary electronic book reader device are operated in an extended display mode.
Figure 11:
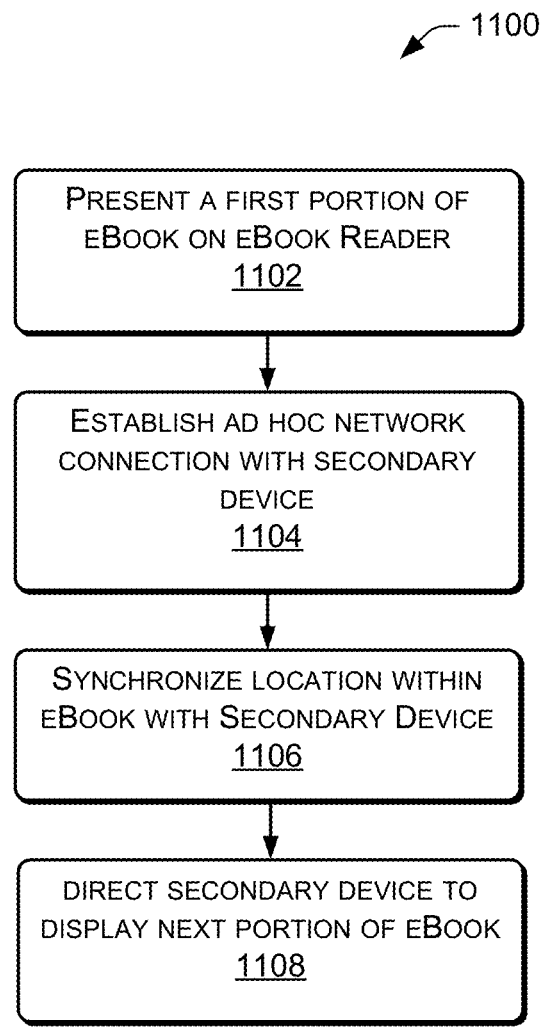
FIG. 11 is a flow diagram showing a process of utilizing a secondary device as an extended display to enhance user experience.

FIGS. 10-11 illustrate another configuration in which a primary device, such as an eBook reader, utilizes the secondary device as an extended display. In this example, the secondary device is embodied as another eBook reader device, such as device 104(1), although it need not be.

FIG. 10 shows a configuration 1000 in which a primary eBook reader device 102 and a secondary eBook reader device 104(1) are operated in an extended display mode. Each device is configured with an electronic book reader application so that both devices are able to render an eBook. As above, the two devices are communicatively coupled via an ad hoc network connection 1002 and the reader applications synchronize to the same location within the eBook.

In this implementation, the two eBook reader devices 102 and 104(1) communicate in a peer-to-peer arrangement. Both devices can initiate communication with the other. In fact, the user may turn pages using either device so that in some situations the turn page command may be transferred from the primary eBook reader device 102 to the secondary eBook reader device 104(1), while in other situations the turn page command may be transferred in the opposite direction. In this way, the two devices coordinate back and forth to effectuate page turning so that one device shows one page, and the other device shows the next page.

As shown here, the primary eBook reader device 102 shows a portion 1004 of the eBook (e.g., chapter 1 and beginning text). Once connected and synchronized via the ad hoc network connection 1002, the secondary eBook reader device 104(1) displays the next portion 1006 of the eBook that immediately follows the first portion presented on the primary eBook reader device. As one example scenario, suppose a reader is using two eBook reader devices to show two pages (or screen views) of the eBook simultaneously. When held side-by-side as shown in FIG. 10, the two displays enhance the reader's experience by simulating an open book with a left page and a right page joined at the spine.

When the reader inputs an instruction 1008 on the primary eBook reader device 102 to move to the next screen view, the primary eBook reader device 102 displays the next or third screen view 1010 that follows immediately after the previous or second screen view 1006. Concurrently, the secondary eBook reader device 104(1) transitions to the next or fourth screen view 1012, which follows immediately after the previous or third screen view 1010. In this manner, the "next" operation 1008 simulates the reader turning a page in an open book.

In another configuration, the portions displayed on the two devices need not be immediately next to one another. For instance, one device may display one portion of an eBook, such as the chapter that the reader is currently reading, while the other device displays another portion of the eBook, such as the table of contents or a chart or graph found on another page. Thus, as the reader moves through the eBook on one device, she maintains another portion of the book on the second device.

Further, since the content is digital, the notion of page breaks are arbitrary and may be made essentially anywhere. Thus, content displayed across two devices may be shifted partially to change how the content breaks across the two devices. For instance, suppose the user wants to see a first excerpt about mid page on the left-hand device 102, together with a second excerpt that is just after the page being displayed on the right-hand device 104(1). In this case, the user may shift the content "up" by one-half of a page so that the first and second excerpts are shown concurrently on both devices.

FIG. 11 shows a process 1100 of utilizing a secondary device as an extended display to enhance user experience. Additional reference may be made to the example configuration of FIG. 10.

At 1002, a first portion of an eBook is presented on a display of the primary eBook reader device. At 1004, a connection with a secondary device (e.g., eBook reader device) is established over an ad hoc network. At 1006, the eBook reader device synchronizes with the secondary device to a location within the eBook. At 1008, once placed in the extended display mode, the eBook reader device directs the secondary device to display a next portion of the electronic book that immediately follows the portion of the electronic book being presented on the display of the eBook reader device. When the reader initiates a "next" operation, the primary eBook reader device displays a next or third screen view that immediately follows the previous screen view. Concurrently, the secondary eBook reader device moves to a next or fourth screen view that immediately follows the third screen view.

Example Configuration: Secondary Device as Extended Device

Figure 12:
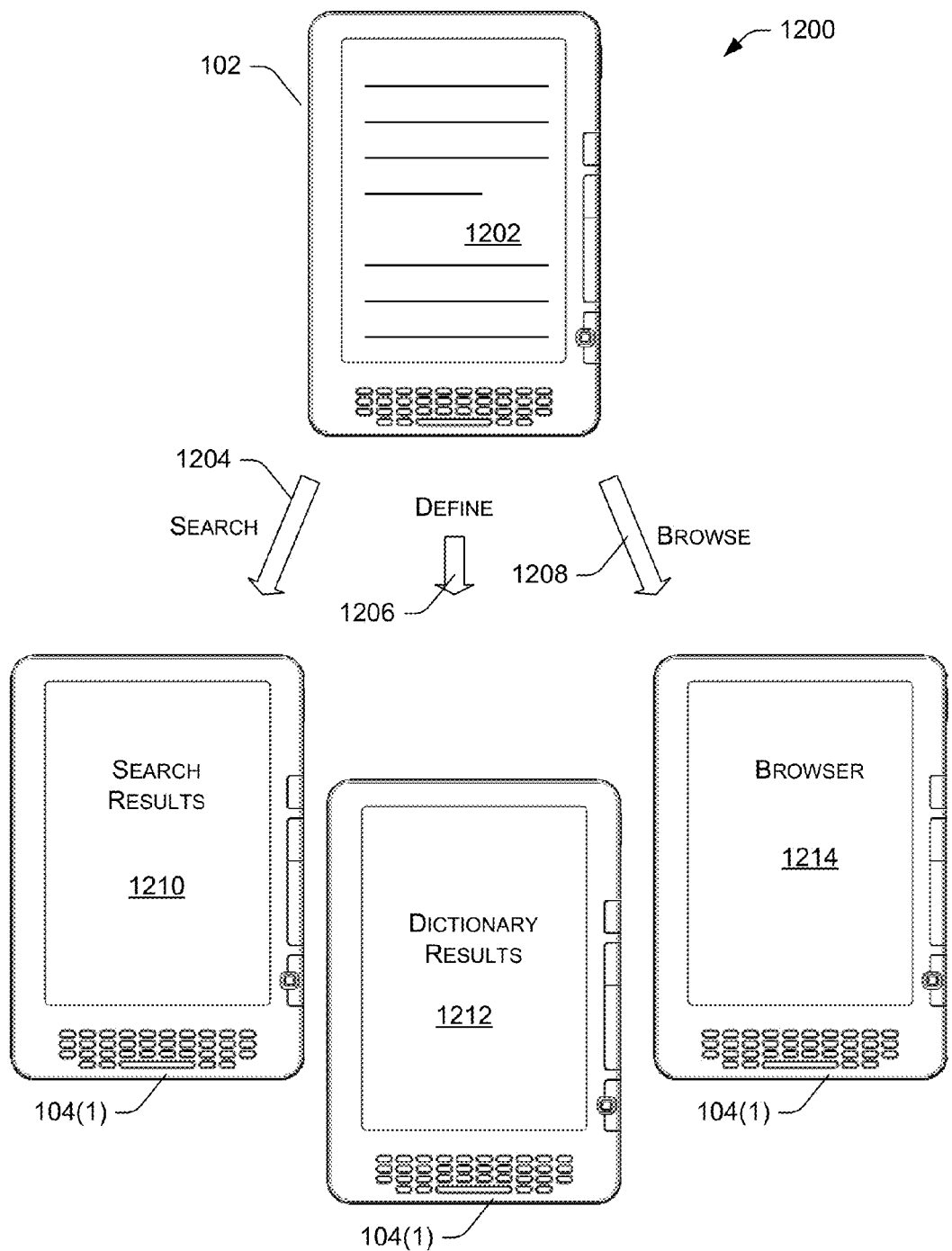
FIG. 12 illustrates a configuration in which a primary electronic book reader device and a secondary electronic book reader device are operated in an extended device mode.
Figure 13:
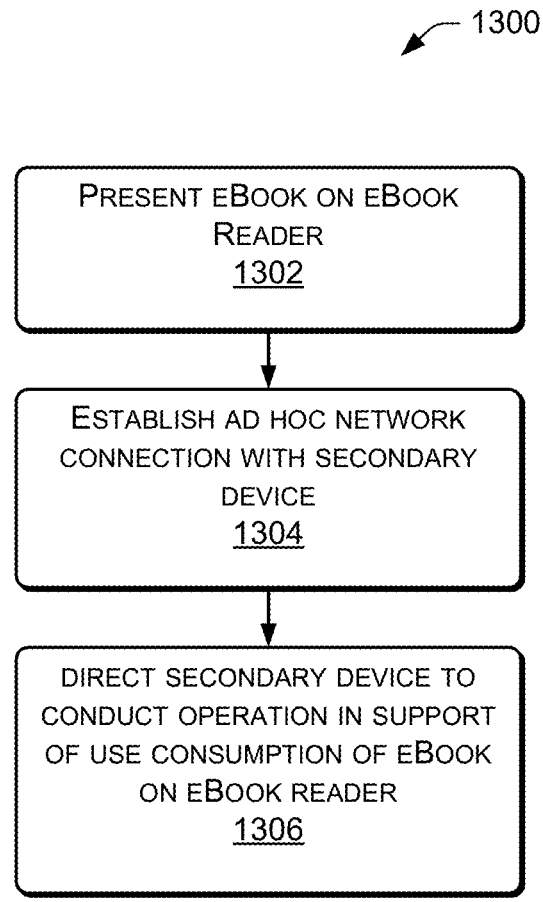
FIG. 13 is a flow diagram showing a process of utilizing a secondary device as an extended device to enhance user experience.

FIGS. 12-13 illustrate yet another configuration in which a primary device, such as an eBook reader, utilizes the secondary device as an extended device that performs operations while the user continues enjoying the eBook on the primary device. In this example, the secondary device is embodied as another eBook reader device, such as device 104(1), although it need not be.

FIG. 12 shows a configuration 1200 in which the primary eBook reader device 102 and a secondary eBook reader device 104(1) are operated in an extended device mode. Each device may optionally be configured with an electronic book reader application, as here with both eBook reader devices; however, in other implementations, the secondary device may not have a reader application installed. As above, the two devices are communicatively coupled via an ad hoc network connection. The secondary eBook reader device 104(1) can then be placed in slave mode to conduct other operations that support user consumption of the eBook on the primary eBook reader device 102.

As shown here, the primary eBook reader device 102 shows a portion of an eBook 1202. While reading the eBook 1202, the user may decide to initiate another operation on the secondary device 104(1). The operation is derived, at least in part, from user interactivity with the eBook 1202 being consumed on the primary eBook reader device 102. Three example operations are shown: search 1204, define a term or phrase 1206, and browse 1208. When the user initiates a search operation 1204, the secondary device 104(1) conducts the search and displays the search results 1210 while the eBook 1202 continues to be displayed on the primary device 102. The search operation maybe a search of other content within the eBook 1202, or a search within the content of other eBooks on the primary device, or a broader external search of content stored at locations accessible over a network, such as the Internet.

When the user initiates a definition operation 1206, the secondary device 104(1) presents the results 1212 of a dictionary analysis of a term or phrase. When the user initiates a browse operation 1208, the secondary device 104(1) launches a browser user interface 1214.

FIG. 13 shows a process 1300 of utilizing a secondary device as an extended device to enhance user experience. Additional reference may be made to the example configuration of FIG. 12.

At 1302, the eBook is presented on a display of the electronic book reader device. At 1304, a connection with a secondary device is established over an ad hoc network. At 1306, responsive to user input, the primary eBook reader device directs the secondary device to conduct an operation in support of user consumption of the eBook being displayed on the eBook reader device. The operations may be essentially any functions that result from user interaction with the content of the eBook on the primary eBook reader device, with examples being (1) conducting a search, (2) launching a browser, or (3) presenting dictionary results.

Example Configuration: Secondary Device as Notepad

FIGS. 14-17 illustrate another configuration in which a primary eBook reader device utilizes the secondary device as a notepad-enabled input device. In the illustrated example, the secondary device may also be embodied as an eBook reader device, but further configured with touch screen functionality. However, other devices may be used as the secondary device, as will be discussed below with respect to FIG. 15.

Figure 14:
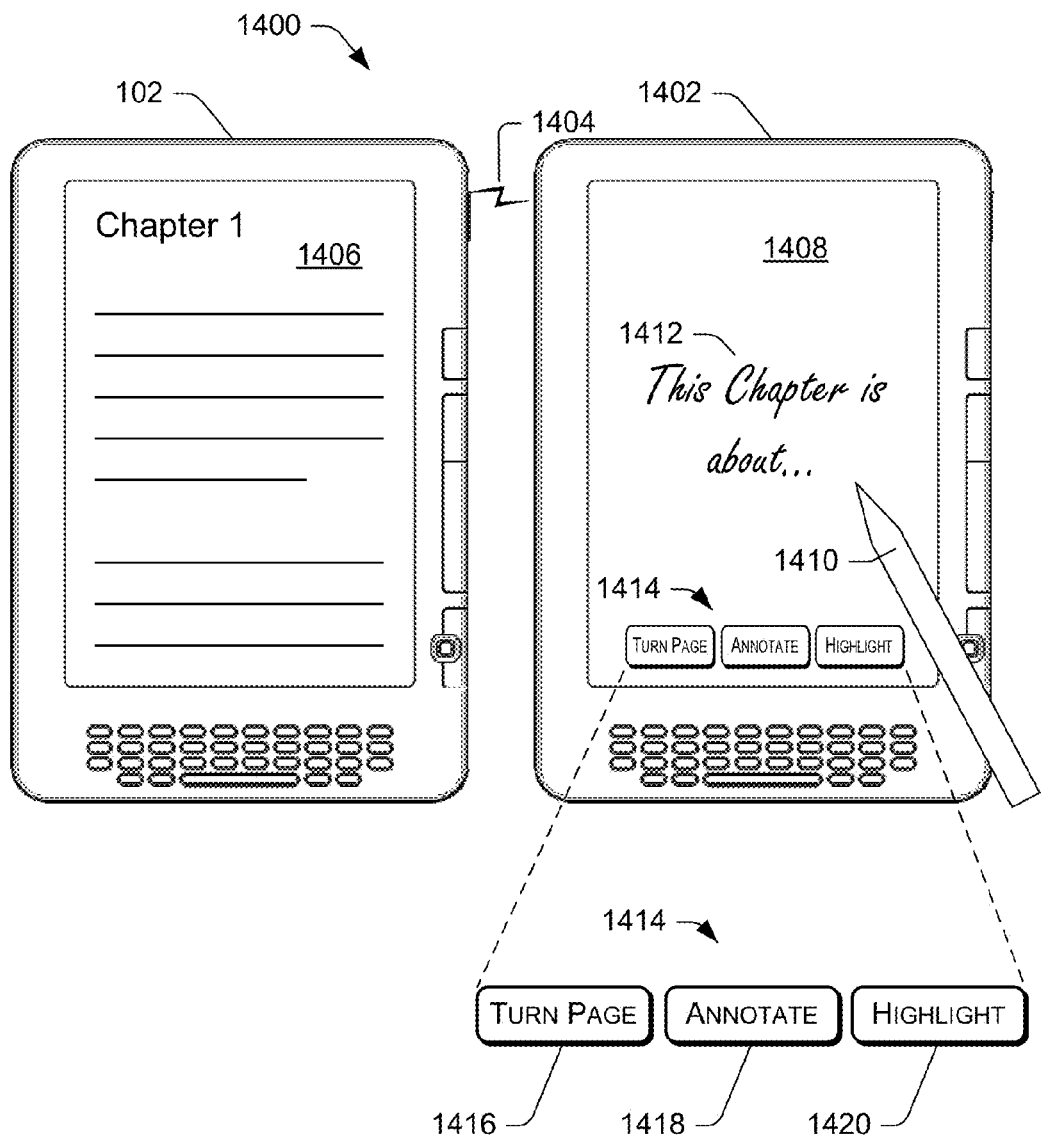
FIG. 14 illustrates a configuration in which a primary electronic book reader device leverages a secondary device equipped with a touch screen and notepad functionality to allow user input with respect to content being presented on the electronic book reader device.

FIG. 14 shows a configuration 1400 in which the primary eBook reader device 102 leverages a secondary device 1402 that is equipped with a touch screen and notepad functionality to allow user input with respect to content being presented on the eBook reader device 102. In this example, the secondary device 1402 is embodied as an eBook reader device having a touch responsive display overlaid on, or otherwise cooperating with, the passive ePaper display. The two devices are communicatively coupled via an ad hoc network connection 1404. When the devices are within proximity of one another, the devices discover each other and establish the ad hoc network connection 1404. Once connected, the devices synchronize such that a user can enter content via the touch responsive display on the secondary device 1402 that is coordinated with the portion of content, such as an eBook, being presented on the eBook reader device 102. In this way, the secondary device 1402 is used as an input device for the primary eBook reader device 102, where the input may include freeform note taking.

As shown here, the primary eBook reader device 102 depicts a portion 1406 of the eBook (e.g., chapter 1 and beginning text). Once connected and synchronized via the ad hoc network connection 1404, the secondary eBook reader device 1402 with notepad functionality can be used to facilitate user input in regards to the portion 1406 of the eBook. The secondary eBook reader device 1402 is equipped with a touch responsive screen 1408 that is capable of receiving user input entered via a stylus 1410 or other pointing device (e.g., finger, pen, etc.). The secondary eBook reader device 1402 allows the user to enter freeform comments pertaining to the text or content being consumed on the primary eBook reader device 102. For instance, the reader may wish to enter notes about the eBook as she reads. Here, the reader may describe the contents of Chapter 1 in a note 1412 (e.g., "This Chapter is about . . . ").

In one scenario, the eBook may be a book that a reader is enjoying, and is merely taking notes for self gratification or to share with others who may be interested in the book. As another example scenario, the eBook being depicted on the primary eBook reader device 102 may be a text book that a student is reading, and the notes are entered for study and educational purposes. The freeform notes are associated with the portion 1406 of the eBook, and stored on the primary eBook reader device 102 as part of the metadata associated with the eBook.

As still another example scenario, the eBook may be a test booklet that is issued by a teacher during a test or final. The test booklet rendered on the primary device 102 may show content about which the student is being tested. The various content portions have associated questions that are conveyed from the primary eBook reader device 102 to the secondary eBook reader device 1402 via the ad hoc network connection 1404 and shown on the touch-responsive display 1408. The student may then answer the questions by writing freeform answers that are associated with the questions. The answers may be stored back on the primary eBook reader device 102 or transmitted to a remote and secure server that collects the answers.

In addition to freeform input, the secondary notepad-enabled device 1402 may be used to receive other forms of user input. As shown in FIG. 14, the secondary device may present soft key control buttons 1414 that support operations relevant to the content being presented on the primary eBook reader device 102. Three example controls are illustrated at the bottom of the display 1408, and enlarged beneath the device to better show the functionality. A turn page button 1416 allows the user to turn the page on the eBook being presented on the primary eBook reader device 102. Thus, in response to a user touch (e.g., using stylus 1410 or a finger), the turn page button 1416 generates a signal that is transmitted via the connection 1404 to the primary eBook reader device 102 to cause the device to move to the next screen of content 1406. An annotate button 1418 enables the user to annotate portions of the content 1406 shown on the primary eBook reader device 102. By actuating the annotate button 1418, the user can write annotation comments on the notepad screen 1408 of the secondary device that are associated with the content 1406. A highlight button 1420 permits the user to highlight portions of the content 1406 on the primary eBook reader device 102. When actuated, the user can move the stylus 1410 along the touch screen 1408 to approximate the portion of content 1406 being highlighted.

It is noted that controls 1414 are merely representative examples, and other controls may be employed. Further, more or fewer than three soft keys may be depicted at a time. In some implementations, the soft keys change depending upon usage scenarios. For example, actuation of a turn page control 1416 may cause presentation of other soft key controls, such as buttons that allow the user to turn to the next chapter, or to the beginning of the eBook, or to a table of contents.

Additionally, although illustrated as a wireless connection between the two devices, certain aspects may be practiced where the two devices are connected via a physical connector, such as a USB cable. It is further noted that the secondary device may be other devices besides an eBook reader device embodied with a touch screen and notepad functionality.

Figure 15:
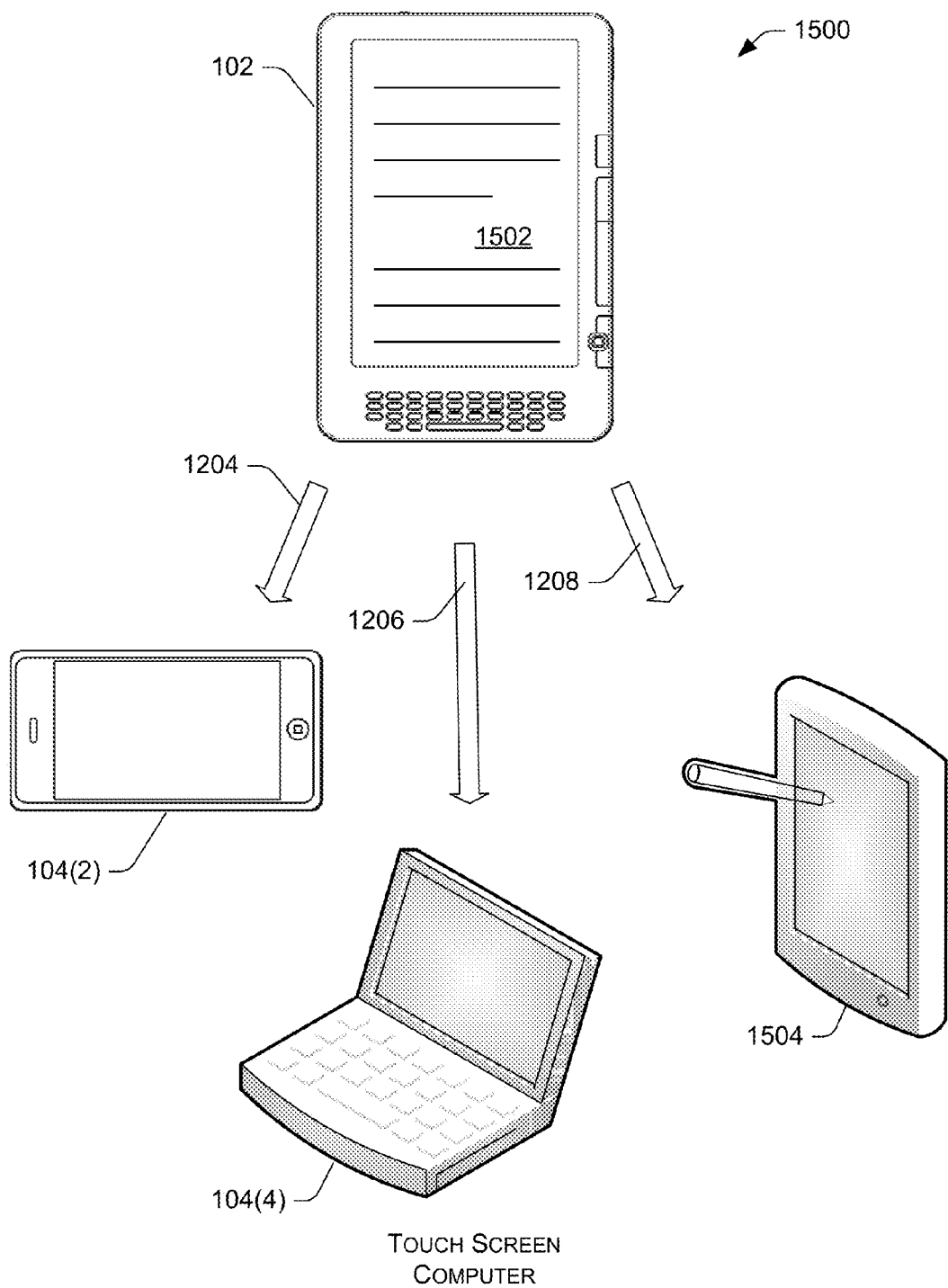
FIG. 15 illustrates a configuration in which a primary electronic book reader device leverages various types of secondary device that can function as an accessory notepad.

FIG. 15 shows a configuration 1500 in which a primary electronic book reader device leverages various types of secondary devices that can function as an accessory notepad to the primary eBook reader device 102. As shown here, the primary eBook reader device 102 shows a portion of an eBook 1502. While reading the eBook 1502, the user may use a secondary device as an input device and/or notepad. Three example devices are shown: a multifunction communications device 104(2) such as the iPhone® device from Apple, Inc., a portable computer 104(4) with a touch screen, and a tablet computer 1504. Each of these representative secondary devices is configured to receive input from a user via a touch sensitive display. As such, the user can employ any of these devices to execute compatibility operations pertaining to the eBook 1502 being shown on the primary eBook reader device 102. The devices may allow user entry of freeform notes, presentation of questions and user entry of answers, user input for control functions, and functionality such as annotating and highlighting.

The illustrated secondary devices are merely representative. Essentially any electronic device that is equipped with a touch-responsive display and supports a connection to other devices via a wireless ad hoc network may be employed.

Figure 16:
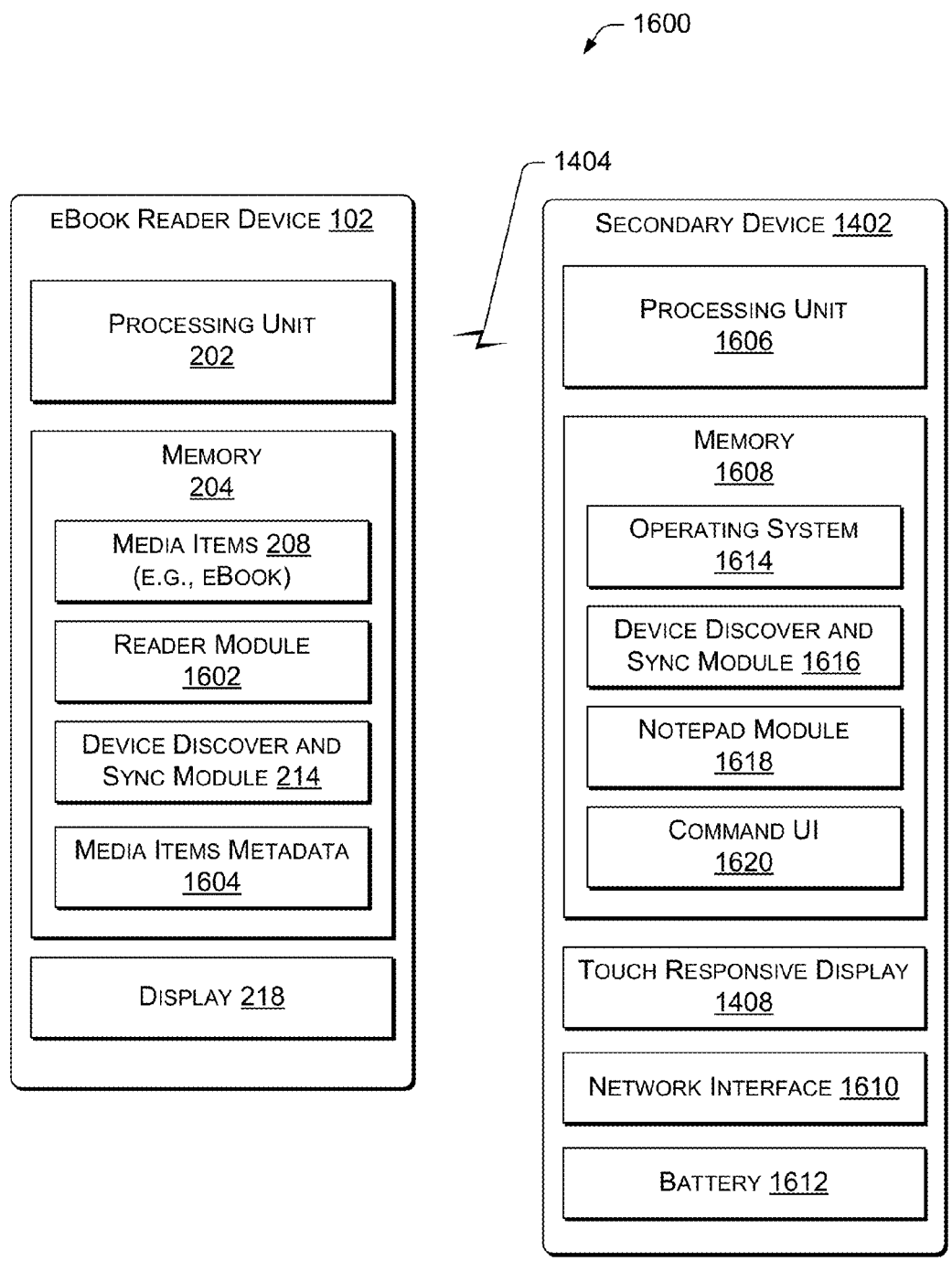
FIG. 16 is a block diagram illustrating selected modules in an electronic book reader device and a secondary device.

FIG. 16 shows selected components in a system 1600 in which the primary eBook reader device 102 is communicating with the secondary device 1402. The device 102 is essentially similar to the device shown and described above with respect to FIG. 2. It includes the processing unit 202 and memory 204. The memory 204 stores an eBook storage database containing one or more media items 208, such as eBooks and audio books. A reader module 1602 is shown stored in the memory 204 to render the eBooks, although other content presentation applications may be employed as discussed above with respect to FIG. 2. A device discover and synchronization module 214 is stored in memory 204 and executed on the processing unit 202 to establish a connection with the neighboring secondary device 1402 over an ad hoc network 1404. Once connected, the module 214 further facilitates synchronization with the secondary device.

The media items 208 are rendered on the display 218. As noted above, the display 218 includes an electronic paper display that presents text or other rendered images even when very little or no power is supplied to it. When a media item is being rendered, such as an electronic book, the secondary device 1402 may be leveraged to allow user input relative to the content being presented on the display 218. In some cases, the user input may be in the form of notes, annotations, or highlights. This user input is transferred to the eBook reader device 102 via the connection 1404 and stored as metadata 1604 in relation to the content portions being rendered on the display. That is, the metadata 1604 is associated through data structures or linking instructions with the media items to which the notes, annotations, and highlights pertain.

The secondary device 1402 is also an electronic device, which may be embodied in any number of ways. Generally, it includes a processing unit 1606 composed one of one or more processors, and memory 1608. The memory 1608 may include, but is not limited to, RAM, ROM, EEPROM, flash memory, or other memory technology. The secondary device 1402 is equipped with a touch responsive display 1408. This display allows user input through contact with the screen using, for example, a stylus or other pointing device (e.g., pen, finger, etc.). In some implementations, the touch responsive display permits multi-point contact.

The secondary device 1402 has a network interface 1610, which supports both wired and wireless connection to various networks, such as cellular networks, radio, WiFi networks, short range networks (e.g., Bluetooth), IR, and so forth. The network interface 1610 further supports the peer-to-peer connection over the ad hoc network 1404. The secondary device 1402 is also equipped with a battery 1612 to provide a power source during portable use.

The memory 1608 may be used to store any number of functional components that are executable on the processing unit 1606. Depending upon various implementations, the memory 1608 may store an operating system 1614. A device discover and synchronization module 1616 is stored in memory 1608 and executed on the processing unit 1606. The discover and synchronization module 1616 establishes a connection with a neighboring device (e.g., eBook reader device 102) over the ad hoc network 1404, and once connected, facilitates synchronization with the other device.

A notepad module 1618 may also be provided in memory 1608 and executed on the processing unit 1606 to facilitate user input via the touch responsive display 1408. The notepad module 1618 allows input of freeform notes, such as the note 1412 shown entered via a stylus 1410 in FIG. 14. Additionally, a command UI 1620 may be provided to allow user enter through menus and/or soft key commands, such as via the soft key buttons 1414 shown in FIG. 14.

Figure 17:
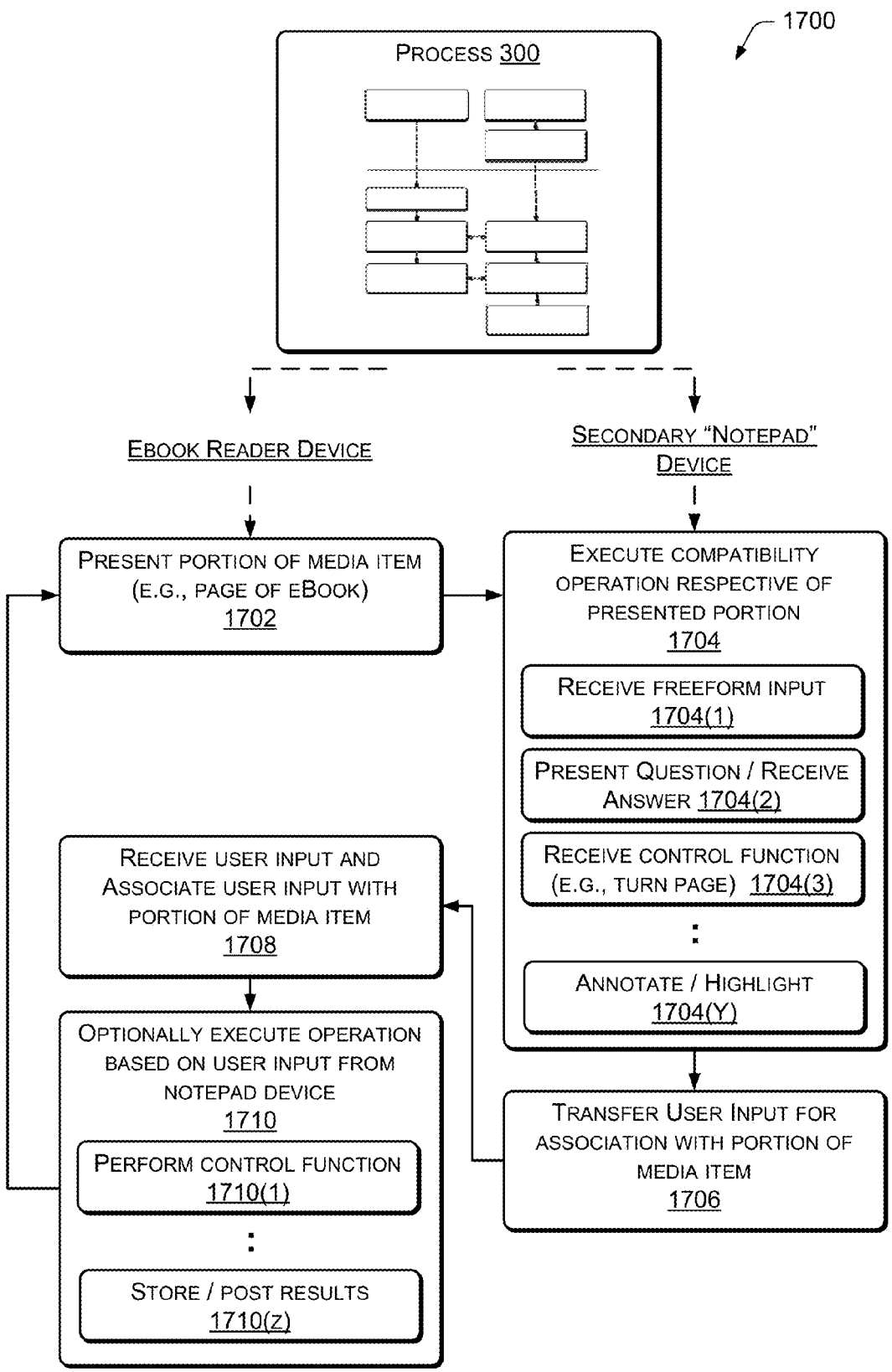
FIG. 17 is a flow diagram showing a process of utilizing a secondary device as a notepad to facilitate user input with respect to content being presented on a primary electronic book reader device.

FIG. 17 shows a process 1700 of utilizing a secondary device as a notepad to facilitate user input with respect to content being presented on the primary electronic book reader device. The process 1700 optionally begins with the set up and establishment of an ad hoc network, such as process 300 described above with respect to FIG. 3. It is noted, however, that some aspects may be practiced via a physical wired connection between the primary and secondary devices. Additional reference may be made to the example configuration of FIG. 14.

At 1702, the primary eBook reader device presents a portion of a media item, such as a page of an eBook or a section of a magazine or test document. At 1704, a compatibility operation is executed on the secondary notepad-enabled device, such that the compatibility operation is relevant to the content shown on the primary eBook reader device. Representative compatibility operations 1704(1)-(Y) are identified in FIG. 17. For instance, one operation is to receive freeform input from the user via a touch screen, at 1704(1). This is illustrated, for example, by the freehand script 1412 shown entered on the touch responsive display 1408 in FIG. 14. At 1704(2), another possible operation is to present a question pertaining to the content shown on the primary eBook reader device and to receive user entry of a response or answer. At 1704(3), another compatibility operation is to receive user entry of a control function, such as turn the page, skip to the next chapter, or return to a home screen. Finally, at 1704(Y), another example operation is to enable user entry of annotations or highlights of the content shown on the primary eBook reader device.

At 1706, the user input is transferred back to the primary eBook reader device for association with the portion of the media item being depicted on the primary eBook reader device. For instance, control functions are passed to the eBook reader device for execution as if the user input has been entered on the same device. Notes, annotations and highlights are passed to the eBook reader device for storage in relationship with the media item.

At 1708, the user input is received at the eBook reader device and associated with the media item or specific portions of that media item. For instance, the freeform notes, annotations, highlights, and so forth, can be saved as part of the metadata for an eBook file.

At 1710, the primary eBook reader device optionally executes an operation based on the compatibility operation results received from the secondary device. Representative operations include performing the control function entered via the secondary device, at 1710(1), and storing or posting results from such functions as annotations and highlighting, at 1710(Z). The process 1700 continues as the user consumes the media item, as represented by the return path from 1710 to 1702.

Example Configuration: Multiple Auxiliary Devices

Figure 18:
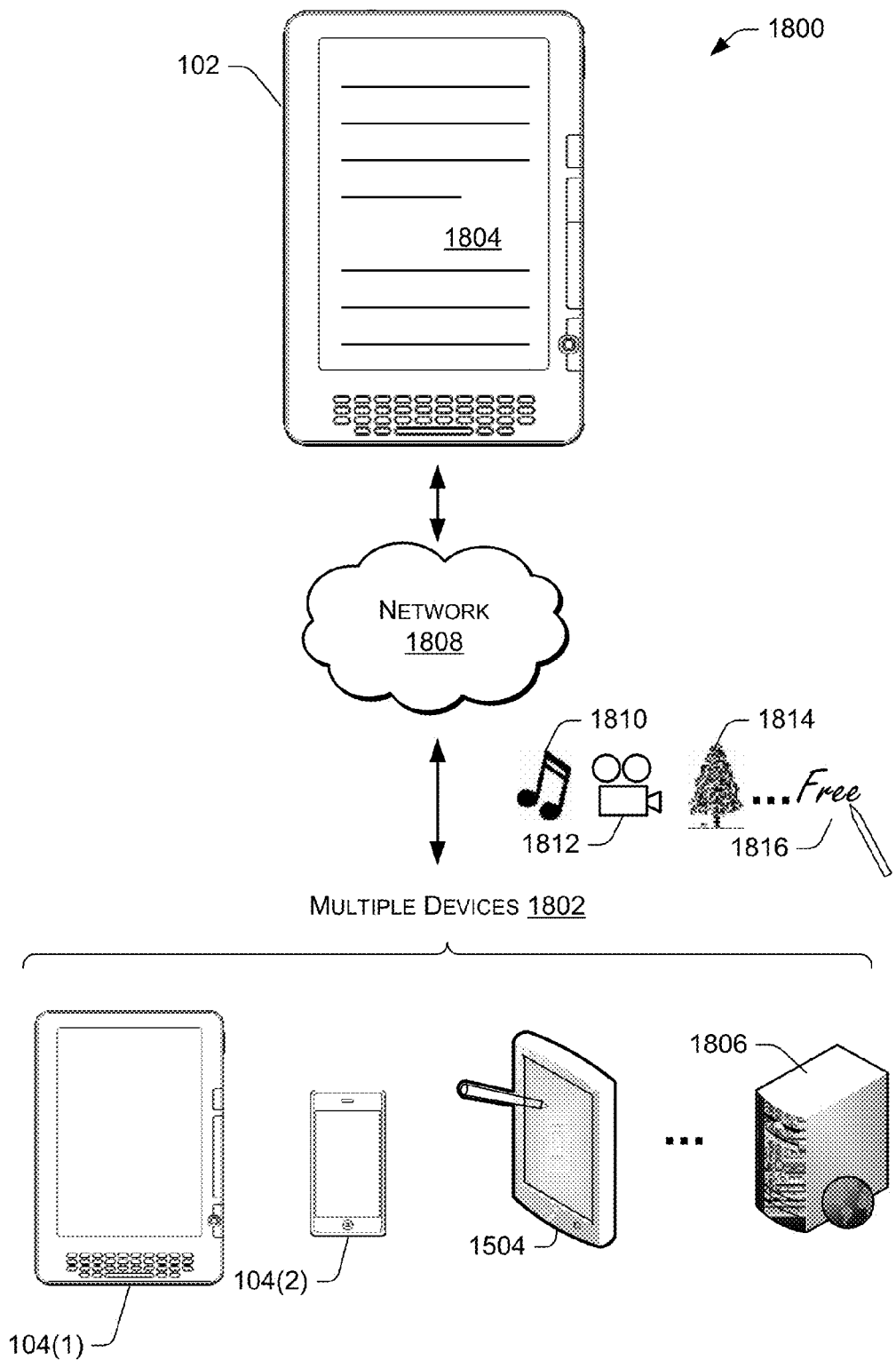
FIG. 18 illustrates a configuration in which a primary electronic book reader device leverages multiple auxiliary devices to receive various types of user input.

FIG. 18 illustrates another example configuration 1800 in which the primary eBook reader device 102 leverages multiple auxiliary devices 1802 to receive various types of user input. The primary eBook reader device 102 shows a portion of an eBook 1804 being depicted on the display. While reading the eBook 1804, the user may use multiple auxiliary devices 1802 to receive user input relative to the eBook 1804 being rendered on the primary eBook reader device 102. Example devices shown include a second eBook reader device 104(1), a multifunction communication device 104(2), a tablet computer 1504, and a remote computer/server 1806. The illustrated secondary devices are merely representative.

All of the devices are configured with network modules to enable communication over a network 1808. The network 1808 represents any number of various networks, including a peer-to-peer ad hoc network, a wireless network (e.g., cellular), a LAN, a WAN, wire-based networks (e.g., cable), and so forth.

Each of these representative secondary devices is equipped with a user input component that receives some form of user input. In these examples, the user input may be in the form of an audio clip 1810, a video clip 1812, an image 1814, and freeform entry 1816. As one example scenario, the user may be reading the eBook 1804 and wish to add a freeform note, as well as an audio commentary. The user may employ the tablet computer 1504 to enter the freeform note, and the communication device 104(2) to record the voice commentary. Each of these user inputs may then be passed over the network 1808 and stored by the eBook reader device 102 in association with the eBook 1804.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
under control of an electronic book reader device configured with executable instructions,
presenting a portion of a media item on the electronic book reader device;
establishing a connection with a secondary notepad device, the secondary notepad device being independent of, but communicatively coupled to, the electronic book reader device and being configured with a touch responsive display;
synchronizing a location within the media item with the secondary notepad device to allow the secondary notepad device to execute one or more operations respective of the portion of the media item being displayed on the electronic book reader device, the one or more operations relating to one or more non-text components of the electronic book that are associated with, and that are different from, the portion of the media item and that are presented via the touch responsive display of the secondary notepad device; and
receiving, from the secondary notepad device, user input that is entered via the touch responsive display of the secondary notepad device.

2. The computer-implemented method of claim 1, wherein the media item comprises an electronic book.

3. The computer-implemented method of claim 1, wherein the establishing comprises establishing a connection over an ad hoc network.

4. The computer-implemented method of claim 1, wherein the one or more operations to be executed by the secondary device comprise any one or more of:
receipt of freeform entry;
presentation of questions and receipt of user response to the questions;
receipt of user selection of control functions to control operation of the electronic book reader device;
annotate a selection of the media item presented on the electronic book reader device; and
highlight a section of the media item presented on the electronic book reader device.

5. The computer-implemented method of claim 1, wherein the secondary notepad device is embodied as a second electronic book reader device configured with the touch responsive screen.

6. The computer-implemented method of claim 1, wherein the secondary notepad device comprises one of a tablet computer, a PDA, or a multi-function communication device.

7. A computer-implemented method, comprising:
rendering a portion of an electronic book on an electronic book reader device; and
utilizing a secondary electronic device independent of, but communicatively coupled to, the electronic book reader device to receive user input pertaining to the portion of the electronic book rendered on the electronic book reader device, the secondary electronic device being configured with a touch responsive display to receive the user input, and the user input being associated with one or more non-text components of the electronic book.

8. The computer-implemented method of claim 7, wherein the secondary electronic device is communicatively coupled to the electronic book reader device via an ad hoc network link.

9. The computer-implemented method of claim 7, wherein the user input comprises freeform entry using the touch responsive display of the secondary electronic device.

10. The computer-implemented method of claim 7, wherein the user input comprises an annotation to the portion of the electronic book being rendered on the electronic book reader device.

11. The computer-implemented method of claim 7, wherein the user input comprises a highlight of the portion of the electronic book being rendered on the electronic book reader device.

12. The computer-implemented method of claim 7, wherein the secondary electronic device is further configured to receive other forms of user input, the other forms of user input comprising at least one of an interaction with an audio clip, an image, or a video clip stored on the secondary electronic device.

13. The computer-implemented method of claim 7, further comprising:
providing, to the secondary electronic device, one or more questions pertaining to the electronic book being rendered on the electronic book reader device;
presenting the one or more questions on the touch responsive display; and
receiving user responses to the questions entered using the touch responsive display.

14. The computer-implemented method of claim 7, further comprising:
directing the secondary electronic device to present one or more control functions, for controlling the electronic book reader device, on the touch responsive display;
receiving user selection of a control function; and
executing the control function selected by the user on the electronic book reader device.

15. A handheld electronic book reading device, comprising:
a processor;
a memory accessible by the processor;
a display;
an electronic book application stored in the memory and executable by the processor to render a portion of an electronic book on the display;
a network interface to facilitate connection with a secondary electronic device over an ad hoc network; and
the processor being configured to receive, over the ad hoc network, user input entered using a touch screen on the secondary electronic device and to execute one or more operations relative to the portion of the electronic book in response to the user input, the user input including at least a response to a question that is associated with the portion of the electronic book.

16. The handheld electronic book reading device of claim 15, wherein the display comprises an electronic paper display.

17. The handheld electronic book reading device of claim 15, wherein the user input comprises freeform entry.

18. The handheld electronic book reading device of claim 15, wherein the user input comprises receipt of user selection of control functions to control operation of the electronic book reader device.

19. The handheld electronic book reading device of claim 15, wherein the user input comprises an annotation of a selection of the media item presented on the electronic book reader device.

20. The handheld electronic book reading device of claim 15, wherein the user input comprises at least one of an audio clip, an image, or a video clip.

21. The handheld electronic book reading device of claim 15, wherein the user input comprises highlighting a section of the media item presented on the electronic book reader device.

22. A computer-readable storage media storing computer-readable instructions that, when executed, instruct a processor to perform acts comprising:
render an electronic book on a first display device;
establish a network connection between the first display device and a secondary device equipped with a touch responsive display;
facilitate user input using the touch responsive display on the secondary device, the user input being associated with non-text components of the electronic book and being communicated via the network connection from the secondary device to the first display device; and
associating the user input with a portion of the electronic book being displayed on the first display device and that is associated with the non-text components of the electronic book.

23. The computer-readable storage media of claim 22, wherein the first display device comprises an electronic book reader device having an electronic paper display, and the rendering comprises displaying the electronic book on the electronic paper display.

24. The computer-readable storage media of claim 22, wherein the instructions that facilitate user input comprise instructions that, when executed, facilitate user entry of freeform text using one of a stylus, a finger, or a pointing device.

25. The computer-readable storage media of claim 22, wherein the instructions that facilitate user input comprise instructions that, when executed, present one or more soft key buttons depicted on the touch responsive display.

26. The computer-readable storage media of claim 22, wherein the instructions that associate the user input comprise instructions that receive the user input from the secondary device and store that user input as metadata related to the electronic book.

27. A system comprising:
an electronic book reader device having an electronic paper display to render digital content items, the electronic book reader device having a network module to facilitate connection over a network; and
a secondary electronic device having a touch responsive display to facilitate user input via the touch responsive display, the secondary electronic device having a network module to facilitate connection over the network such that when a connection is established with the electronic book reader device, the user input entered via the touch responsive display on the secondary device being associated with non-text components that are associated with a content item being rendered on the electronic book reader device.

28. The system of claim 27, wherein the secondary electronic device comprises an electronic book reader device having an electronic paper display and a touch screen operating in cooperation with the electronic paper display.

29. The system of claim 27, wherein the secondary electronic device has a notepad module that facilitates entry of freeform notes, the freeform notes being associated with the content item being rendered on the electronic book reader device.

30. The system of claim 27, further comprising one or more additional electronic devices, each additional electronic device having a user input component to receive input from a user and a network module to facilitate connection over the network such that when a connection is established with the electronic book reader device, the user input entered via said each additional electronic device is provided to the electronic book reader device, the user input being at least one of audio, an image, video, a command, or freeform entry.

* * * * *